United States Patent

Kondo et al.

Patent Number: 6,156,183
Date of Patent: Dec. 5, 2000

[54] METHOD OF PROCESSING SPENT REACTOR FUEL WITH MAGNESIUM ALLOY CLADDING

[75] Inventors: Naruhito Kondo; Kenichi Matsumaru, both of Yokohama; Reiko Fujita, Tokyo; Makoto Fujie, Tsukuba, all of Japan

[73] Assignee: Kabushiki Kaisha Toshiba, Kawasaki, Japan

[21] Appl. No.: 09/174,591

[22] Filed: Oct. 19, 1998

[30] Foreign Application Priority Data

Oct. 17, 1997 [JP] Japan ................................ 9-285836

[51] Int. Cl.⁷ ................................ C25C 1/22; C25C 3/34
[52] U.S. Cl. ................................ 205/47; 205/44; 205/46; 205/354
[58] Field of Search ................................ 205/354, 44, 46, 205/47

[56] References Cited

U.S. PATENT DOCUMENTS

| | | | |
|---|---|---|---|
| 4,297,174 | 10/1981 | Brambilla et al. | 205/44 |
| 4,596,647 | 6/1986 | Miller et al. . | |
| 4,880,506 | 11/1989 | Ackerman et al. | 205/44 |
| 5,096,545 | 3/1992 | Ackerman | 205/44 |
| 5,454,914 | 10/1995 | Gay . | |

FOREIGN PATENT DOCUMENTS

| | | |
|---|---|---|
| 1-237497 | 9/1989 | Japan . |
| 2 212 171 | 7/1989 | United Kingdom . |

OTHER PUBLICATIONS

Hibbert, D.B. and James, A.M. Dictionary of Electrochemistry. John Wiley & Sons, New York. 1984. No month available.

Primary Examiner—Kathryn Gorgos
Assistant Examiner—Wesley A. Nicolas
Attorney, Agent, or Firm—Oblon, Spivak, McClelland, Maier & Neustadt, P.C.

[57] ABSTRACT

A spent reactor fuel processing method is provided for recovering at least any one of metallic nuclear fuel materials, in which the reactor fuel is composed by covering the metallic nuclear fuel material with a cladding tube made of alloy and having a melting point lower than that of the metallic nuclear fuel material and end plugs made of alloy are mounted to both ends thereof. The processing method comprises a cladding tube smelting separation process, a molten salt electrorefining process and a salt evaporation separation process for recovering metallic uranium, uranium and plutonium, or uranium, plutonium and transuranium elements.

19 Claims, 15 Drawing Sheets

METHOD OF PROCESSING SPENT REACTOR FUEL WITH MAGNESIUM ALLOY CLADDING

BACKGROUND OF THE INVENTION

FIELD OF THE INVENTION

The present invention relates to a method of processing a spent nuclear reactor fuel to recover uranium, plutonium, transuranium element or the like, and in particular, relates to a processing method of a spent reactor fuel which is preferably applicable to the case of processing a spent reactor fuel in which a metallic nuclear fuel material is covered with an alloy cladding tube (material) having a melting point lower than that of the metallic nuclear fuel material and end plugs made of alloy are mounted to both ends of the reactor fuel.

In the case of processing a spent reactor fuel in which a metallic nuclear fuel material is covered with an alloy cladding tube having a melting point lower than that of the metallic nuclear fuel material and alloy end plugs are mounted to both ends of the reactor fuel, in the known art, there has been publicly known a method comprising the processes or steps of, cutting and separating both ends thereof to mechanically remove the cladding tube, dissolving only metallic nuclear fuel material in nitric acid, and separating and extracting uranium and plutonium according to a solvent extraction so that soluble uranium and plutonium are obtained.

However, a metallic nuclear fuel component still adheres to the both ends of fuel cut and separated according to the aforesaid conventional method, or to the cladding tube mechanically removed. For this reason, if these fuel and cladding tube are processed as wastes, this is a factor of lowering a recovery of metallic nuclear fuel component.

SUMMARY OF THE INVENTION

An object of the present invention is to eliminate defects or drawbacks encountered in the prior art mentioned above and to provide a method of processing a spent nuclear reactor fuel which can reduce an entrainment of metallic nuclear fuel component in a cladding tube component processed as wastes so as to improve a recovery of metallic nuclear fuel component, and can reduce wastes of the component of cladding tube or the like.

This and other objects can be achieved according to the present invention by providing, in one aspect, a method of processing a spent reactor fuel for recovering at least any one of metallic nuclear fuel materials of uranium, plutonium and transuranium element from the spent reactor fuel, in which the reactor fuel as a processing target is composed by covering the metallic nuclear fuel material with a cladding tube made of alloy and having a melting point lower than that of the metallic nuclear fuel material and end plugs made of alloy are mounted to both ends thereof, in a case of processing the spent reactor fuel as it is or processing the spent reactor fuel in a state of cutting and removing both the end plugs in a preprocess, or in a case of processing the end plugs after the cutting thereof to which a fuel component adheres, the processing method comprising:

a cladding tube smelting separation process of heating the processing target at a temperature more than a melting point of the alloy cladding tube and less than a melting point of the metallic nuclear fuel material so as to smelt and separate the alloy cladding tube or the end plugs from the metallic nuclear fuel material;

a molten salt electrorefining process of immersing the metallic nuclear fuel material, in which the alloy cladding tube or end plug is removed in the smelting separation process, in a salt consisting of a molten alkaline metal chloride or alkaline earth metal chloride or a mixture thereof to be used as an anode while a solid electrode or a molten metal electrode being used as a cathode, and dissolving the metallic nuclear fuel material in the salt by applying a current between the anode and cathode while depositing uranium, uranium and plutonium or uranium, plutonium and transuranium elements to the cathode; and a salt evaporation separation process of taking out the processing target from the salt and heating chloride or alkaline earth metal adhering to the deposited element which is deposited and adheres to the cathode in a normal pressure state or in a pressure reducing state so that the chloride or alkaline earth metal is evaporated and separated and recovering metallic uranium, uranium and plutonium, or uranium, plutonium and transuranium elements.

In preferred embodiments of this aspect, in a case where a part of the metallic nuclear fuel material of the processing target is an oxide, before the cladding tube smelting separation process is carried out, the processing method further includes an oxide reduction process of immersing the processing target in a salt consisting of a molten alkaline metal chloride or alkaline earth metal chloride or a mixture thereof, and in this state, further adding alkaline metal or alkaline earth metal to the salt so that an oxide of the metallic nuclear fuel material is reduced to metal.

After the salt evaporation separation process, the processing method further includes an oxidation process of heating a recovered metallic uranium, uranium and plutonium, or uranium, plutonium and transuranium element, under an atmosphere of an oxidative gas so that an uranium oxide, uranium oxide and plutonium oxide, or uranium oxide, plutonium eoxide and transuranium element oxide are obtained.

When the cladding tube is molten and separated from the metallic nuclear fuel material by heating the cladding tube at a temperature more than a melting point of the alloy cladding tube and less than a melting point of the metallic nuclear fuel material, in a case where the nuclear fuel material is entrained in the separated cladding tube alloy component, the processing method further includes an alloy component evaporation separation process of recovering the nuclear fuel material entrained in the alloy component by heating the metallic nuclear fuel material in a normal pressure state or in a pressure reducing state with the use of a difference in a steam pressure between the nuclear, fuel material and the alloy component, and by evaporating and separating the alloy component. The processing method may further include a metallic fuel material oxidation process of heating the spent metallic nuclear fuel material, which is entrained in the cladding tube alloy component recovered in the evaporation separation process, under the atmosphere of the oxidative gas, and recovering the spent metallic nuclear fuel as a fuel material oxide.

Iron or molybdenum capable of selectively recovering uranium is used as a material which is used in the cladding tube smelting separation process and is used as a material for the cathode for depositing uranium, uranium and plutonium, or uranium, plutonium and transuranium element, or cadmium, zinc, bismuth, lead or aluminum capable of being recovered by distillation at a low boiling point and forming an intermetallic compound with plutonium.

The metallic nuclear fuel material from which the cladding tube is removed, is immersed in molten cadmium, bismuth, lead, zinc, other metal, and further, is immersed in the molten alkaline metal chloride or alkaline earth metal chloride or a mixture thereof, and then, a current is applied to an anode using the molten metal and to a cathode using a solid electrode or a molten metal electrode, and the metallic nuclear fuel material is dissolved in the molten salt while uranium, uranium and plutonium, or uranium, plutonium and transuranium element being recovered to the cathode.

After the cladding tube smelting separation process is carried out, the processing method further includes an uranium/plutonium extraction recovery process of immersing the metallic nuclear fuel material, in which the cladding tube is removed, in a molten alkaline metal chloride or alkaline earth metal chloride or a mixture thereof, and making contact the metallic nuclear fuel material to molten cadmium, in which magnesium, sodium, or uranium is dissolved, and thereby, extracting uranium and plutonium, or uranium, plutonium and transuranium elements, which are dissolved in the molten alkaline metal chloride or alkaline earth metal chloride or a mixture thereof from the metallic nuclear fuel material, in the molten cadmium eluted from the molten alkaline metal chloride or alkaline earth metal chloride or a mixture thereof so as to recover them as an alloy with cadmium.

In another aspect of the present invention, there is provided a method of processing a spent reactor fuel for recovering at least any one of metallic nuclear fuel materials of uranium, plutonium and transuranium element from the spent reactor fuel, in which the reactor fuel as a processing target is composed by covering the metallic nuclear fuel material with a cladding tube made of alloy and having a melting point lower than that of the metallic nuclear fuel material and end plugs made of alloy are mounted to both ends thereof, in a case of processing the spent reactor fuel as it is or processing the spent reactor fuel in a state of cutting and removing both the end plugs in a preprocess, or in a case of processing the end plugs after the cutting thereof to which a fuel component adheres, the processing method comprising:

- a cladding tube smelting separation process of heating the processing target at a temperature more than a melting point of the alloy cladding tube and less than a melting point of the metallic nuclear fuel material so as to smelt and separate the alloy cladding tube or the end plugs from the metallic nuclear fuel material;
- a molten salt electrorefining process of immersing the metallic nuclear fuel material, in which the alloy cladding tube or end plug is removed in the smelting separation process, in a salt consisting of a molten alkaline metal chloride or alkaline earth metal chloride or a mixture thereof to be used as an anode while a solid electrode or a molten metal electrode being used as a cathode, and dissolving the metallic nuclear fuel material in the salt by applying a current between the anode and cathode while depositing uranium to the cathode;
- a salt evaporation separation process of taking out the processing target from the salt and heating chloride or alkaline earth metal adhering to the deposited element which is deposited and adheres to the cathode in a normal pressure state or in a pressure reducing state so that the chloride or alkaline earth metal is evaporated and separated and recovering uranium; and
- an uranium/plutonium extraction recovery process of making contact the salt used in the molten salt electrorefining process to molten cadmium in which lithium has been dissolved and extracting uranium and plutonium, or uranium, plutonium and transuranium elements, which are dissolved in the salt from the metallic nuclear fuel material used as the anode, in the molten cadmium eluted from the salt so as to recover said element as an alloy with cadmium.

In preferred embodiment of this aspect, the extraction recovery process uses molten cadmium, in which magnesium in place of lithium is dissolved and makes contact the salt to the molten cadmium in which magnesium has been dissolved, and extracts uranium and plutonium, or uranium, plutonium and transuranium elements, which are dissolved in the salt from the metallic nuclear fuel material used as the anode, in the molten cadmium eluted from the salt so as to recover the elements as an alloy with cadmium.

The extraction recovery process uses molten cadmium, in which sodium in place of lithium is dissolved and makes contact the salt to the molten cadmium in which sodium has been dissolved and extracts uranium and plutonium, or uranium, plutonium and transuranium elements, which are dissolved in the salt from the metallic nuclear fuel material used as the anode, in the molten cadmium eluted from the salt so as to recover the elements as an alloy with cadmium.

The extraction recovery process uses molten cadmium, in which uranium in place of lithium is dissolved and makes contact the salt to the molten cadmium in which uranium has been dissolved and extracts uranium and plutonium, or uranium, plutonium and transuranium elements, which are dissolved in the salt from the metallic nuclear fuel material used as the anode, in the molten cadmium eluted from the salt so as to recover the elements as an alloy with cadmium.

In case where a part of the metallic nuclear fuel material of the processing target is an oxide, before the cladding tube smelting separation process, the processing method further includes an oxide reduction process of immersing the processing target in a salt consisting of a molten alkaline metal chloride or alkaline earth metal chloride or a mixture thereof, and further adding alkaline metal or alkaline earth metal so that an oxide of the metallic nuclear fuel material is reduced to metal.

In place of the extraction process of processing the spent salt, the processing method further includes an electrophoresis process and an uranium/plutonium oxidation process of immersing a cathode and an anode connected to a column which is filled with ceramic powder in the spent salt, generating migration by applying a current to both electrodes so that ion of uranium and plutonium, or uranium, plutonium and transuranium element is concentrated and recovered to the column located on the anode, and thereafter, taking out the column and blowing an oxidative gas into the column, thereby recovering uranium and plutonium, or uranium, plutonium and transuranium element as a deposition oxide.

The processing method further includes a cadmium distillation separation process of heating the recovered cadmium alloy in a normal pressure state or in a pressure reducing state so that only cadmium is evaporated to be separated and removed from uranium and plutonium, or uranium, plutonium and transuranium element, and recovering metallic uranium and plutonium, or uranium, plutonium and transuranium element, and may further include an uranium/plutonium oxidation process of heating metallic uranium and plutonium, or uranium, plutonium and transuranium element, which is recovered in the cadmium distillation separation process, under the atmosphere of the oxidative gas, and obtaining uranium oxide and plutonium oxide, or uranium oxide, plutonium oxide and transuranium element oxide.

After the cladding tube smelting separation process of heating the alloy cladding tube at a temperature more than a melting point of the alloy cladding tube and less than a melting point of the metallic nuclear fuel material so that the alloy cladding tube is molten and separated from the metallic nuclear fuel material, in a case where the nuclear fuel material is entrained in an alloy component of the separated alloy cladding tube, the processing method further includes an evaporation separation process of heating the alloy cladding tube in a normal pressure state or in a pressure reducing state with the use of a difference in steam pressure between the nuclear fuel material and the alloy component so that the alloy component is evaporated and separated, and thereby, recovering the nuclear fuel material entrained to the alloy component. The processing method may further include a metallic fuel material oxidation process of heating the spent metallic nuclear fuel material, which is entrained in the cladding tube alloy component recovered in the evaporation separation process, under the atmosphere of the oxidative gas, and recovering the spent metallic nuclear fuel as a fuel material oxide.

The metallic nuclear fuel material from which the cladding tube is removed, is immersed in molten cadmium, bismuth, lead, zinc, other metal, and further, is immersed in the molten alkaline metal chloride or alkaline earth metal chloride or a mixture thereof, and then, a current is applied to an anode using the molten metal and to a cathode using a solid electrode, and thereby, the metallic nuclear fuel material is dissolved in the molten salt while uranium being recovered to the cathode.

As described in detail in the above embodiments, according to the processing method of a spent reactor fuel of the present invention, there is no need of mechanically removing both ends and the cladding tube of the spent fuel. Further, in the case of mechanically removing these both ends and cladding tube, inclusive of the removed end plug, it is possible to reduce an entrainment of the metallic nuclear fuel component in the cladding tube component which is processed as wastes, so that the recovery of the metallic nuclear fuel component can be improved, and also, wastes of cladding tube component can be reduced.

The nature and further characteristic features of the present invention may be made more clear from the following descriptions made with- reference to the preferred embodiments represented by the accompanying drawings.

DESCRIPTION OF THE PREFERRED EMBODIMENTS

Embodiments of the present invention will be described below with reference to the accompanying drawings.

Figure 1:
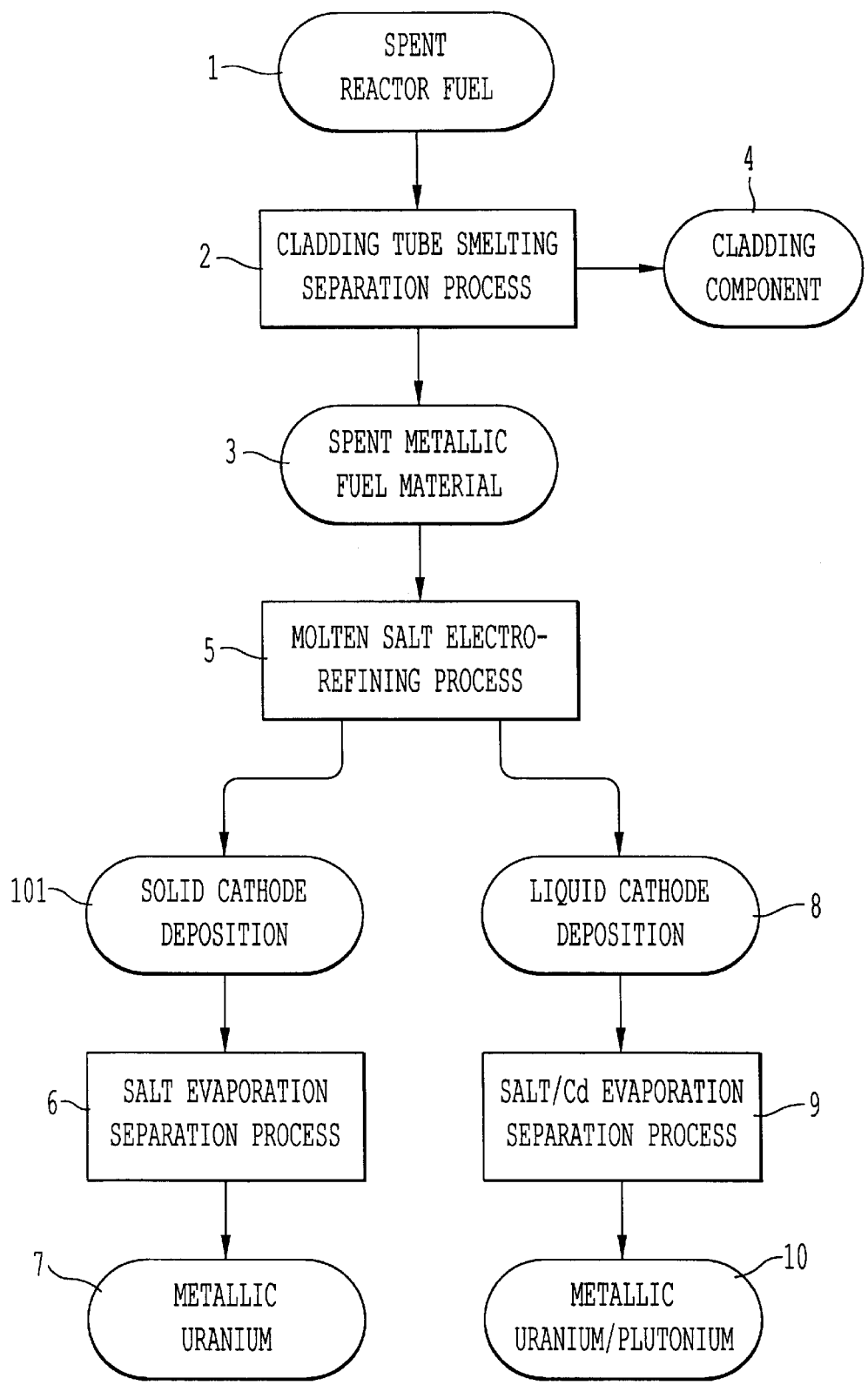
FIG. 1 is a flowchart showing a processing method of a spent reactor fuel according to first and fifth embodiments of the present invention.
Figure 2:
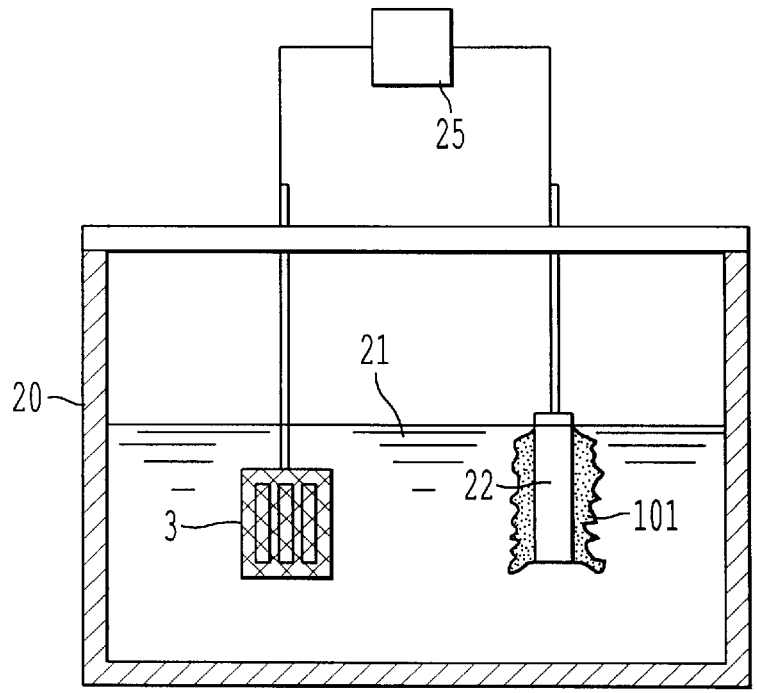
FIG. 2 is a view to explain a concept of a molten salt electrorefining process in the case of using a solid cathode as a cathode in the above embodiments.
Figure 3:
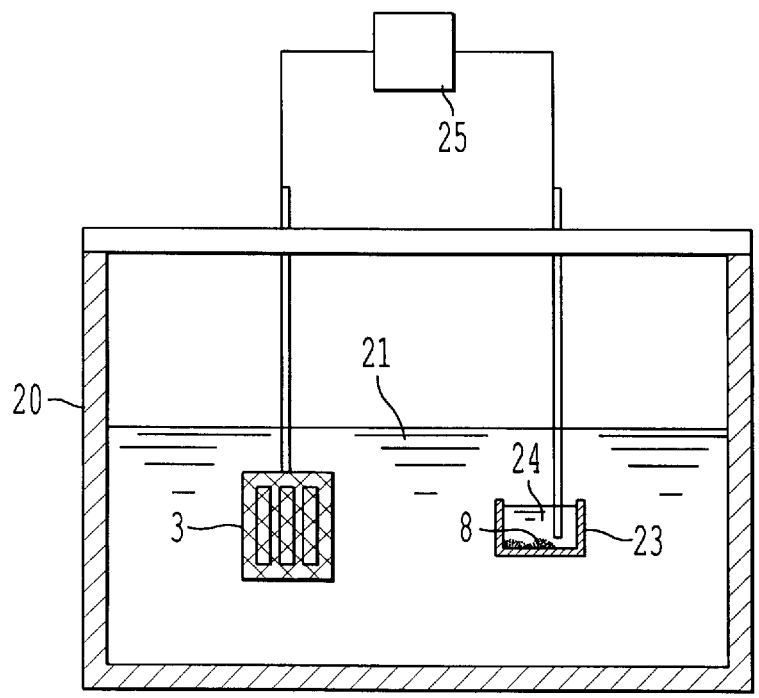
FIG. 3 is a view to explain a concept of a molten salt electrorefining process in the case of using a liquid cathode as a cathode in the above embodiments.

First Embodiment (FIG. 1, FIG. 2 and FIG. 3)

FIG. 1 is a flowchart showing a processing method of a spent reactor fuel according to embodiments of the present invention. FIG. 2 and FIG. 3 are a view to explain a concept of a molten salt electrorefining process in FIG. 1.

A fuel processed by the method of this first embodiment is a spent reactor fuel in which a metallic nuclear fuel material (e.g., uranium) is covered with an alloy cladding tube (sheath) (e.g., magnesium alloy) having a melting point lower than that of the metallic nuclear fuel material, and alloy end plugs are mounted to both ends of the reactor fuel.

In this first embodiment, as shown in FIG. 1, in a cladding tube smelting separation process 2, the spent reactor fuel 1 after being used in a reactor is heated at a temperature more than a melting point of the alloy cladding tube and less than a melting point of the metallic nuclear fuel material (e.g., 650° C. to 1000° C. in the case of a fuel in which a metallic uranium fuel is covered with a magnesium alloy cladding tube), and thereby, the alloy cladding tube and an end plug are molten (fused) so as to separate from each other, and thus, a spent metallic fuel material 3 is obtained. On the other hand, an alloy cladding component 4 thus separated is made into an alloy component ingot. The spent metallic fuel material 3 is electrolytically processed in a molten salt electrorefining process 5.

In the molten salt electrorefining process 5, as shown in FIG. 2, alkaline metal chloride or alkaline earth metal chloride or a mixture of them is heated to the melting point so as to obtain a molten (fused) salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition deposit) (metallic uranium) 101 is deposited on the solid electrode 22. A predetermined current is supplied, and thereafter, the solid cathode 22, on which the solid cathode deposition 101 is deposited, is taken out from the molten salt 21.

Next, as shown in FIG. 3, a liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the aforesaid solid cathode deposition 101. For this reason, as shown in FIG. 1, in a salt evaporation (vaporization) separation process 6, the salt 21 is evaporated (vaporized) by heating it in a normal pressure or in a pressure reducing state so as to separate from the solid cathode deposition 101, and thus, metallic uranium 7 is recovered.

On the other hand, in the liquid cathode deposition 8, there coexists a metal (e.g., cadmium) which is a component of the liquid cathode 24, and a part of salt 21 adheres to the liquid cathode deposition 8. For this reason, in a salt/Cd evaporation (vaporization) separation process 9, the salt 21 and the component metal of the liquid cathode 24 is evaporated (vaporized) by heating them in a normal pressure or in a pressure reducing state so as to separate from the liquid cathode deposition 8, and thus, metallic uranium/plutonium 10 is recovered.

According to this first embodiment, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 4:
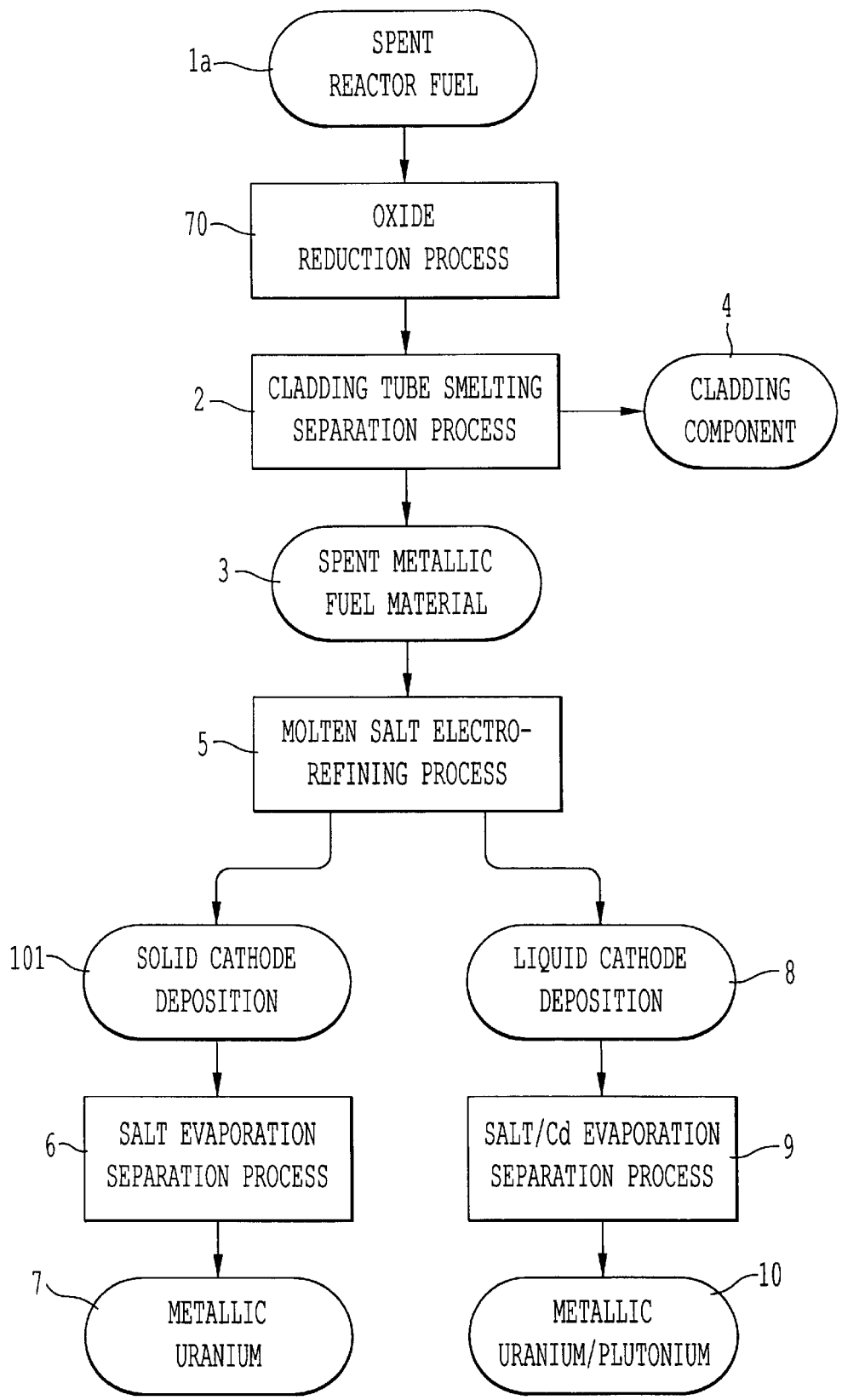
FIG. 4 is a flowchart showing a processing method of a spent reactor fuel according to a second embodiment of the present invention.

Second Embodiment (FIG. 4, FIG. 2 and FIG. 3)

FIG. 4 is a flowchart showing a processing method of a spent reactor fuel according to a second embodiment of the present invention.

In this second embodiment, an oxide reduction process is carried out before the aforesaid cladding tube separation process 2 of the first embodiment is carried out. Namely, in this second embodiment, a processing target is a spent reactor fuel in which the whole or part of metallic nuclear fuel material (e.g., uranium) is oxidized.

More specifically, as shown in FIG. 4, an oxidized spent reactor fuel 1a is first processed in an oxide reduction process 70. In the oxide reduction process 70, the salt 21 shown in FIG. 2 and FIG. 3 is used. Namely, alkaline metal chloride or alkaline earth metal chloride or a mixture of them is heated to the melting point so as to obtain a molten salt 21, and then, the molten salt 21 thus obtained is stored in a container 20, and further, the oxidized spent reactor fuel 1a is immersed in the molten salt 21. Thereafter, alkaline metal (e.g., lithium) or alkaline earth metal (e.g., magnesium) is added into the molten salt 21 so that a reaction is made, and then, an oxide of the nuclear fuel material is reduced to metal. The metallic nuclear fuel material (e.g., uranium) obtained in the oxide reduction process 70 is covered with an alloy cladding tube (e.g., magnesium alloy) having a melting point lower than the metallic nuclear fuel material. In this second embodiment, after the oxide reduction process 70, the spent reactor fuel 1a is heated in the cladding tube smelting separation process 2 at a temperature more than a melting point of the alloy cladding tube and less than a melting point of the metallic nuclear fuel material (for example, 650° C. to 1000° C. in the case where a metallic uranium fuel is covered with a magnesium alloy cladding tube), whereby the alloy cladding tube and the end plug are molten (fused) and separated from each other so as to obtain the spent metallic fuel material 3 while the separated alloy cladding component 4 being made into an alloy component ingot. Further, the spent metallic fuel material 3 is electrolytically processed in the molten salt electrorefining process 5.

In the molten salt electrorefining process 5, as shown in FIG. 2, alkaline metal chloride or alkaline earth metal chloride or a mixture of them is heated to the melting point so as to obtain a molten salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

Next, as shown in FIG. 3, a liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the aforesaid solid cathode deposition 101. For this reason, as shown in FIG. 4, in a salt evaporation separation process 6, the salt 21 is evaporated by heating it in a normal pressure or in a pressure reducing state so as to separate from the solid cathode deposition 101, and thus, metallic uranium 7 is recovered.

On the other hand, in the liquid cathode deposition 8, there coexists a metal (e.g., cadmium) which is a component of the liquid cathode 24, and a part of salt 21 adheres to the liquid cathode deposition 8. For this reason, in the salt/Cd evaporation separation process 9, the salt 21 and the component metal of the liquid cathode 24 is evaporated by heating them in a normal pressure or in a pressure reducing state so as to separate from the liquid cathode deposition 8, and thus, metallic uranium/ plutonium 10 is recovered.

According to this second embodiment, like the aforesaid first embodiment, the spent reactor fuel 1a is entirely processed without mechanically removing both ends of the spent reactor fuel 1a and the cladding tube. Therefore, it is possible to reduce an entrainment of metallic nuclear component in the cladding tube component or the like which is processed as wastes, so that the recovery can be improved, and also, wastes can be reduced.

Figure 5:
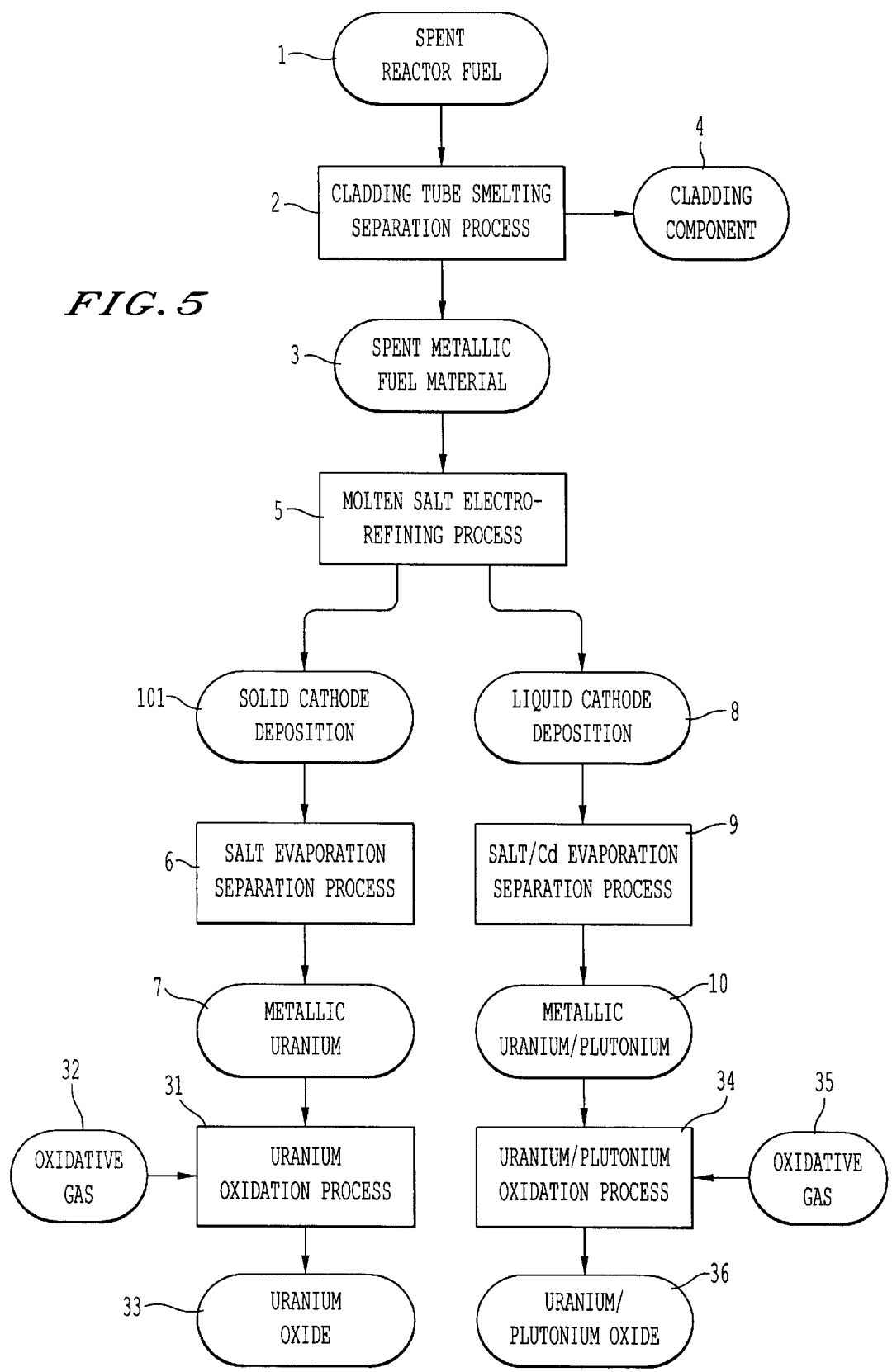
FIG. 5 is a flowchart showing a processing method of a spent reactor fuel according to a third embodiment of the present invention.

Third Embodiment (FIG. 5)

In this third embodiment, an oxidation process is further added with respect to the metallic uranium 7 and uranium/plutonium 34 obtained in the aforesaid first embodiment.

FIG. 5 is a flowchart showing a processing method of a spent reactor fuel according to a third embodiment of the present invention. The details of the same processes as FIG. 1 are omitted.

In an uranium oxidation process 31, the metallic uranium 7 obtained in the salt evaporation separation process 6 is heated under the atmosphere of an oxidative gas 32 (for example, a mixture gas of inert gas and oxygen gas, a mixture gas of inert gas and water vapor, or air or a mixture gas of air and water vapor) so as to be oxidized, and thereby an uranium oxide 33 is obtained.

Further, in an uranium/plutonium oxidation process 34, the metallic uranium/plutonium 10 obtained by the method described in the first embodiment is heated under the atmosphere of an oxidative gas (for example, a mixture gas of inert gas and oxygen gas, a mixture gas of inert gas and water vapor, or air or a mixture gas of air and water vapor) so as to be oxidized, and thereby an uranium/plutonium oxide 36 is obtained.

According to this third embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 6:
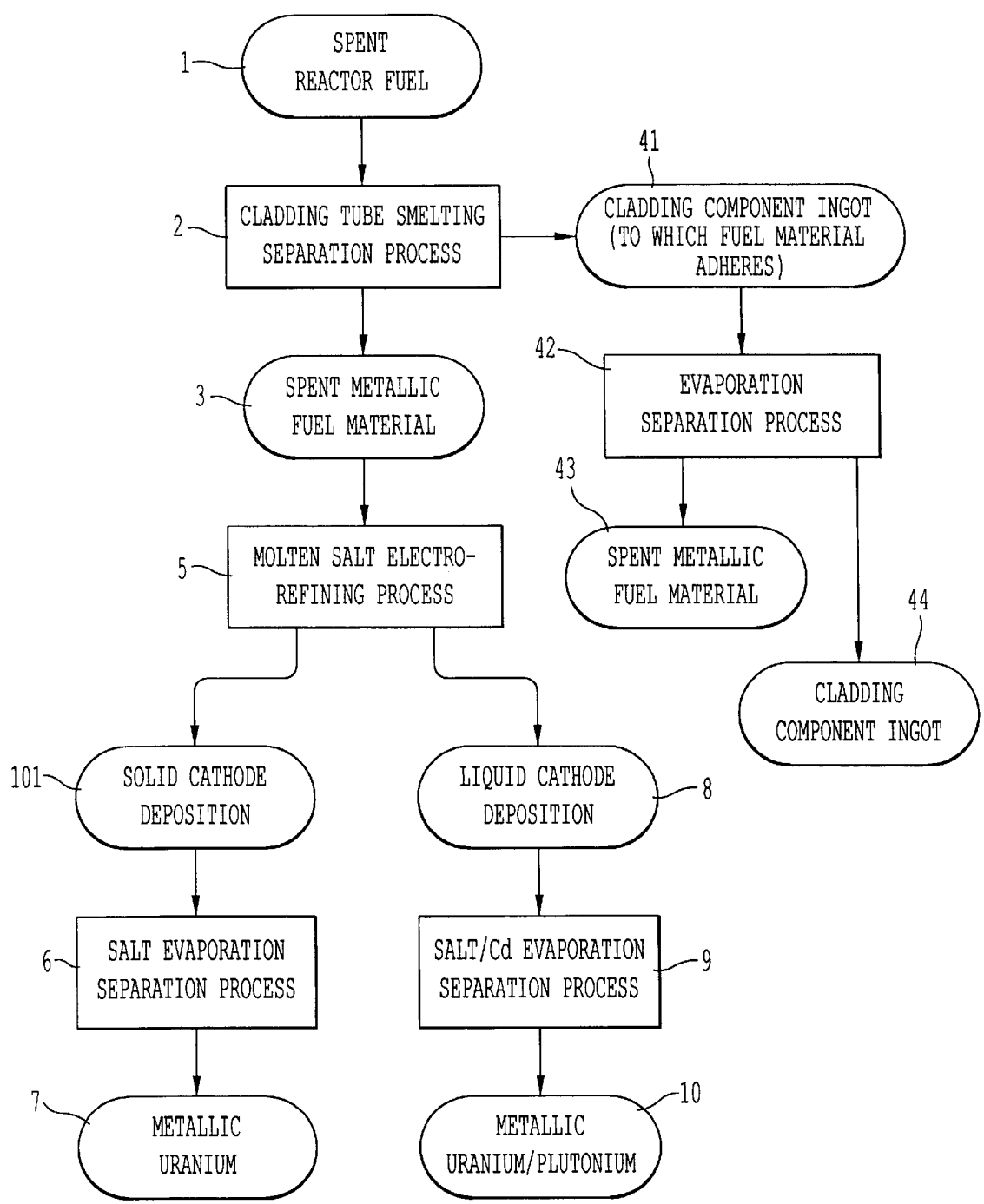
FIG. 6 is a flowchart showing a processing method of a spent reactor fuel according to a fourth embodiment of the present invention.

Fourth Embodiment (FIG. 6)

FIG. 6 is a flowchart showing a processing method of a spent reactor fuel according to a fourth embodiment of the present invention.

According to this fourth embodiment, in the method described in the first embodiment, in the case where the fuel material adheres to the cladding component ingot 41 separated from the spent metallic fuel component in the cladding tube smelting separation process 2, in an evaporation (vaporization) separation process 42, the cladding component ingot 41 is heated in a normal pressure state or in a pressure reducing state (for example, in the case where the cladding tube is a magnesium alloy, about 900 to 1200° C. in a normal pressure state about 600 to 800° C. in a pressure reducing state of about 1 kPa) so that the cladding component is evaporated (vaporized) and separated, and thus, a spent metallic fuel component 43 is recovered from the cladding component ingot (to which the fuel material adheres). On the other hand, the cladding component thus separated is recovered as a cladding component ingot 44.

According to this fourth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Fifth Embodiment (FIG. 1, FIG. 2 and FIG. 3)

A fuel processed by the method of a fifth embodiment is a spent reactor fuel in which a metallic nuclear fuel material (e.g., uranium) is covered with an alloy cladding tube (e.g., magnesium alloy) having a melting point lower than that of the metallic nuclear fuel material, and alloy end plugs are mounted to both ends of the reactor fuel.

In this fifth embodiment, like the aforesaid first embodiment shown in FIG. 1, in the cladding tube smelting separation process 2, the aforesaid spent reactor fuel 1 after being used in a reactor is heated at a temperature more than a melting point of the alloy cladding tube and less than a melting point of the metallic nuclear fuel material (e.g., 650° C. to 1000° C. in the case of a fuel in which a metallic uranium fuel is covered with a magnesium alloy cladding tube), and thereby, the alloy cladding tube and an end plug are molten (fused) so as to separate from each other, and thus, a spent metallic fuel material 3 is obtained. On the other hand, an alloy cladding component 4 thus separated is made into an alloy component ingot. The spent metallic fuel material 3 is electrolytically processed in a molten salt electrolytic process 5.

In the molten salt electrorefining process 5, as shown in FIG. 2, alkaline metal chloride or alkaline earth metal chloride or a mixture of them is heated to the melting point so as to obtain a molten (fused) salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

Next, as shown in FIG. 3, a liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the aforesaid solid cathode deposition 101. For this reason, as shown in FIG. 1, in a salt evaporation separation process 6, the salt 21 is evaporated by heating it in a normal pressure or in a pressure reducing state to separate from the solid cathode deposition 101, and thus, metallic uranium 7 is recovered.

It is important that the solid cathode 22 is iron (fermium) or molybdenum, which is a material having the following properties, and more specifically, no reaction with chloride is made in alkaline metal chloride or alkaline earth metal chloride or a mixture thereof, or it is hard to make a reaction such that the chloride is dissolved and then, potassium (kalium) is deposited, or a chlorine gas is generated. A part of molten salt 21 adheres to the solid cathode deposition 101. For this reason, in the salt evaporation separation process 6, the salt 21 is evaporated by heating it in a normal pressure or in a pressure reducing state so as to separate from the solid cathode deposition 101, and thus, metallic uranium 7 is obtained.

On the other hand, it is important that the liquid cathode 24 is a liquid metal which is capable of depositing and recovering uranium and plutonium at an operating temperature of 500° C. or more, and is a material having a low boiling point and capable of separating uranium and plutonium by distillation.

Further, it is important that the liquid being a constituent material of plutonium and the liquid cathode 24, is cadmium, zinc, bismuth, lead and aluminum, which are capable of forming an intermetallic compound to lower an activity.

In the liquid cathode deposition 8, there coexists with metal (e.g., cadmium) which is a component of the liquid cathode 24, and for this reason, a part of molten salt 21 adheres to the liquid cathode deposition 8. In the salt/Cd evaporation separation process 9, the salt and the component metal of the liquid cathode 24 are evaporated by heating them in a normal pressure or in a pressure reducing state so as to separate from the solid cathode deposition 101, and thus, metallic uranium/plutonium 10 is obtained.

According to this fifth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 7:
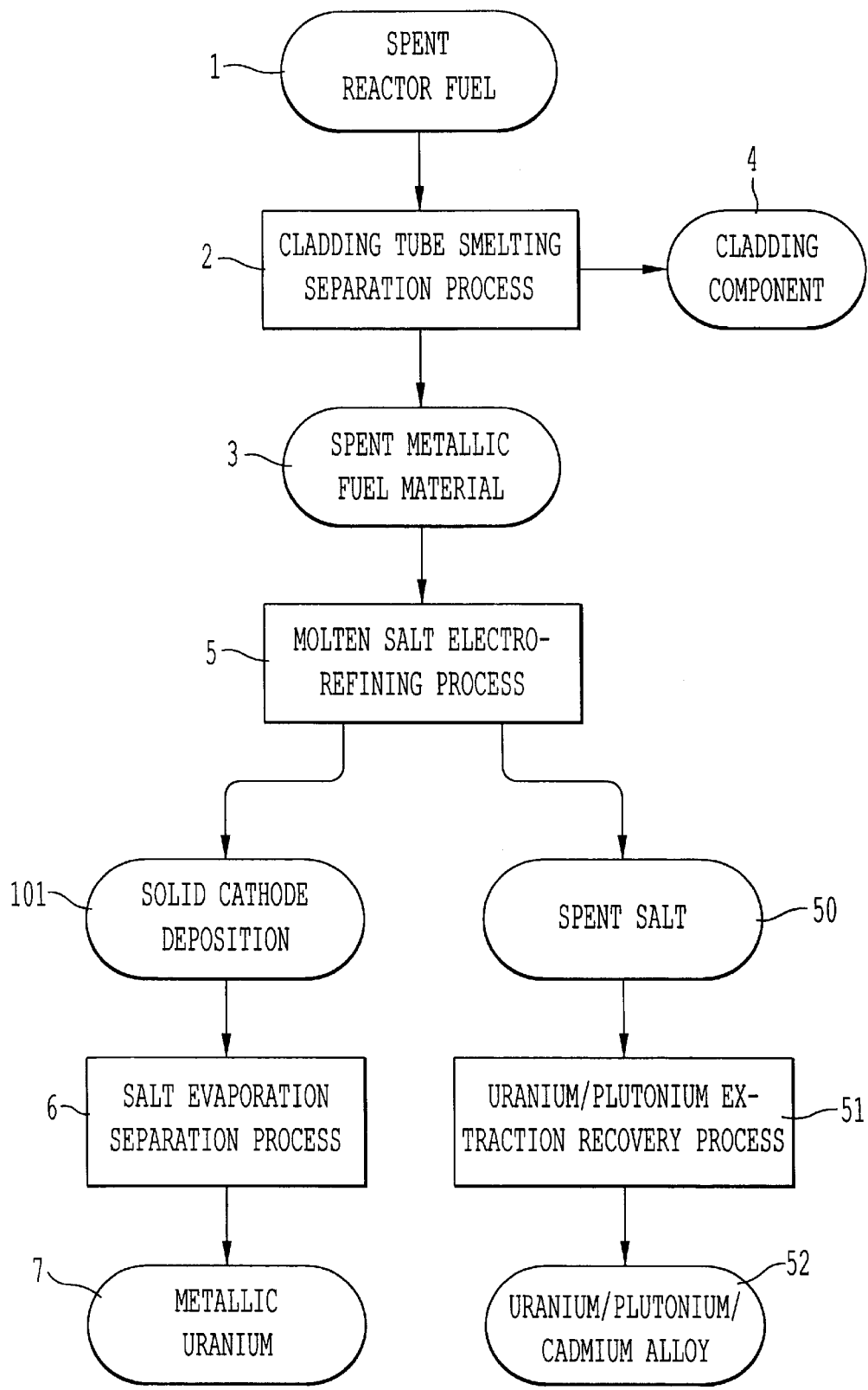
FIG. 7 is a flowchart showing a processing method of a spent reactor fuel according to a sixth embodiment of the present invention.

Sixth Embodiment (FIG. 7 and FIG. 2)

FIG. 7 is a flowchart showing a processing method of a spent reactor fuel according to a sixth embodiment of the present invention.

A fuel processed by the method of this sixth embodiment is a spent reactor fuel in which a metallic nuclear fuel material (e.g., uranium) is covered with an alloy cladding tube (e.g., magnesium alloy) having a melting point lower than that of the metallic nuclear fuel material, and alloy end plugs are mounted to both ends of the reactor fuel.

In this sixth embodiment, as shown in FIG. 7, in a cladding tube smelting separation process 2, the aforesaid spent reactor fuel 1 after being used in a reactor is heated at a temperature more than a melting point of the alloy cladding tube and less than a melting point of the metallic nuclear fuel material (e.g., 650° C. to 1000° C. in the case of a fuel in which a metallic uranium fuel is covered with a magnesium alloy cladding tube), and thereby, the alloy cladding tube and an end plug are molten (fused) so as to separate from each other, and thus, a spent metallic fuel material 3 is obtained. On the other hand, an alloy cladding component 4 thus separated is made into an alloy component ingot. The spent metallic fuel material 3 is electrolytically processed in a molten salt electrorefining process 5.

In the molten salt electrorefining process 5, as shown in FIG. 2, alkaline metal chloride or alkaline earth metal chloride or a mixture thereof is heated to the melting point so as to obtain a molten (fused) salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

A part of the salt 21 adheres to the aforesaid solid cathode deposition 101. For this reason, as shown in FIG. 7, in a salt evaporation separation process 6, the salt 21 is evaporated by heating it in a normal pressure or in a pressure reducing state so as to separate from the solid cathode deposition 101, and thus, metallic uranium 7 is recovered.

On the other hand, uranium and Plutonium eluted from the spent metallic fuel material 3 used as an anode exist in alkaline metal chloride or alkaline earth metal chloride or a spent salt 50 which is a mixture thereof, which is stored in the container 20 after the recovery of the solid cathode deposition by the solid electrode 22. For this reason, in an uranium/ plutonium extraction recovery process 51, these uranium and plutonium are made in contact to a molten metallic extracting solvent (e.g., lithium, magnesium, sodium or cadmium in which uranium is dissolved), and then, are extracted into a molten cadmium, and thus, an uranium/plutonium/cadmium alloy 52 is obtained.

According to this sixth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 8:
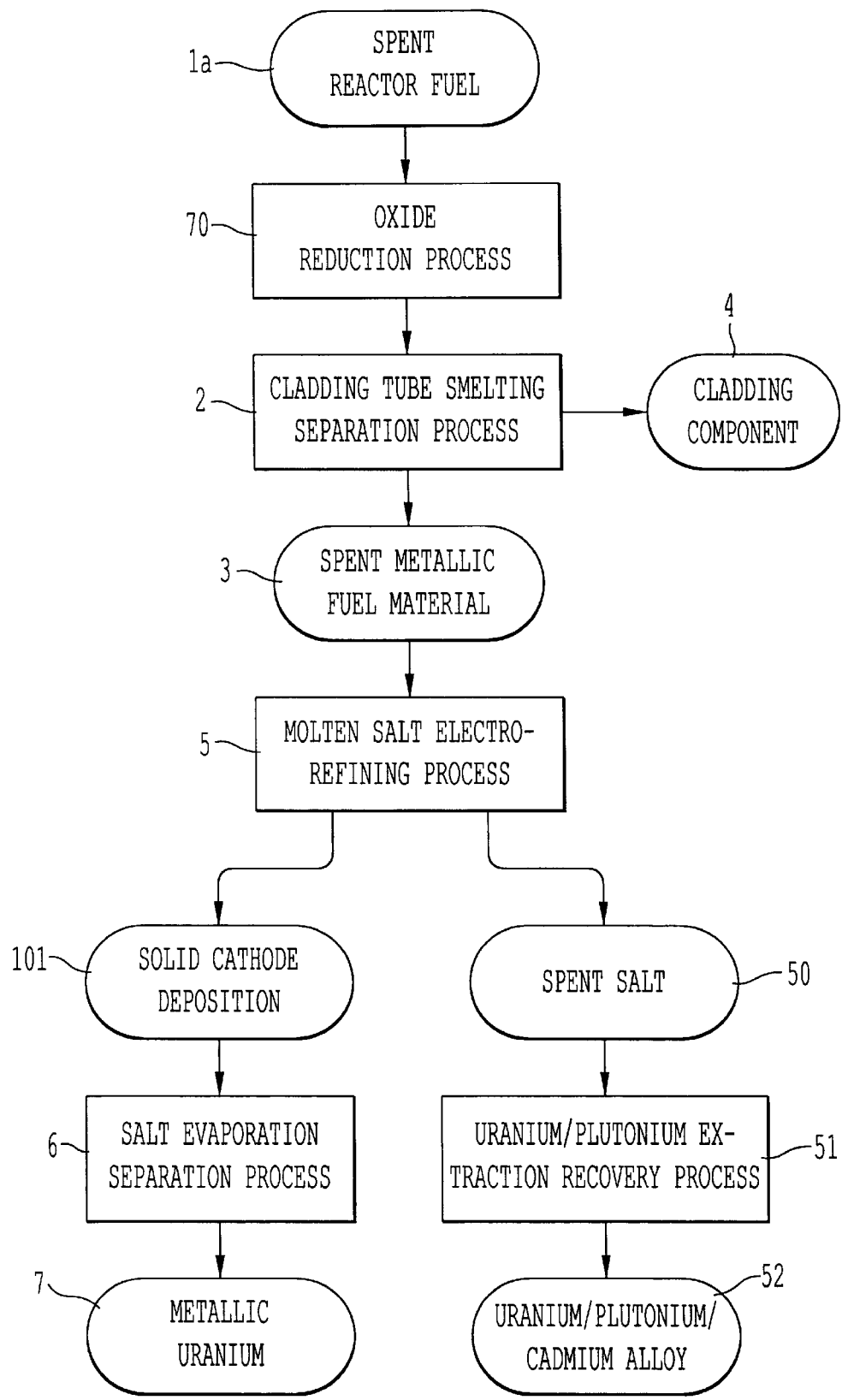
FIG. 8 is a flowchart showing a processing method of a spent reactor fuel according to a seventh embodiment of the present invention.

Seventh Embodiment (FIG. 8, FIG. 2 and FIG. 3)

FIG. 8 is a flowchart showing a processing method of a spent reactor fuel according to a seventh embodiment of the present invention.

In this seventh embodiment, an oxide reduction process is carried out before the cladding tube separation process 2 of the sixth embodiment is carried out. Namely, in this seventh embodiment, a processing target is a spent reactor fuel in which the whole or part of metallic nuclear fuel material (e.g., uranium) is oxidized.

More specifically, as shown in FIG. 8, an oxidized spent reactor fuel 1a is first processed in an oxide reduction process 70. In the oxide reduction process 70, the salt 21 shown in FIG. 2 and FIG. 3 is used. Namely, alkaline metal chloride or alkaline earth metal chloride or a mixture of them is heated to the melting point so as to obtain a molten salt 21, and then, the molten salt 21 thus obtained is stored in a container 20, and further, the oxidized spent reactor fuel 1a is immersed in the molten salt 21. Thereafter, alkaline metal (e.g., lithium) or alkaline earth metal (e.g., magnesium) is added into the molten salt 21 so that a reaction is made, and then, an oxide of the nuclear fuel material is reduced to metal.

Thereafter, the same process as the sixth embodiment is carried out, and then, metallic uranium 7 and metallic uranium/plutonium/cadmium alloy 52 are obtained.

According to this seventh embodiment, like the aforesaid embodiments, the spent reactor fuel 1a is entirely processed without mechanically removing both ends of the spent reactor fuel 1a and the cladding tube. Therefore, it is possible to reduce an entrainment of metallic nuclear component in the cladding tube component or the like which is processed as wastes, so that the recovery can be improved, and also, wastes can be reduced.

Figure 9:
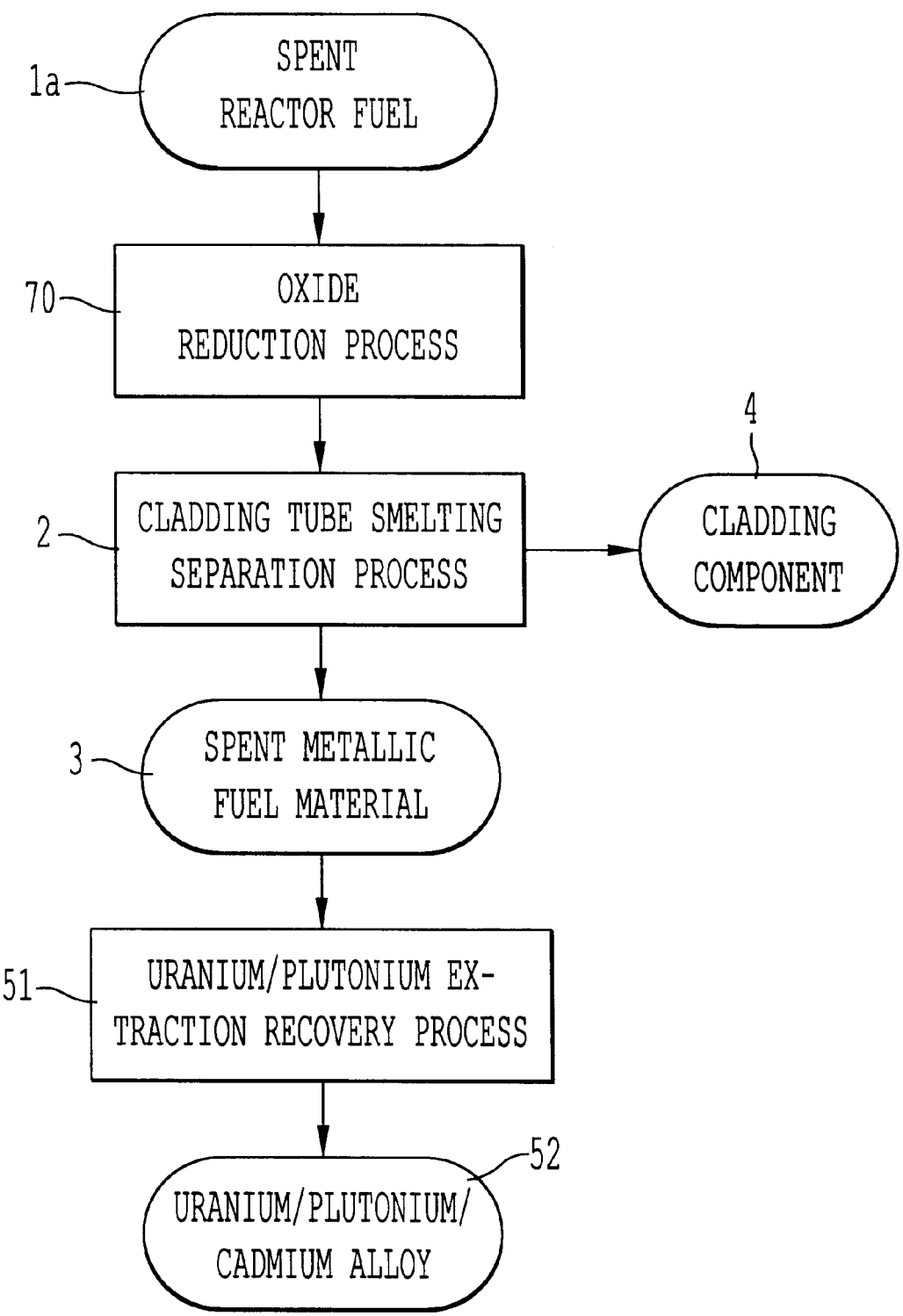
FIG. 9 is a flowchart showing a processing method of a spent reactor fuel according to an eighth embodiment of the present invention.

Eighth Embodiment (FIG. 9)

FIG. 9 is a flowchart showing a processing method of a spent reactor fuel according to an eighth embodiment of the present invention.

In this eighth embodiment, an oxide reduction process is carried out before the aforesaid cladding tube separation process 2 is carried out. Namely, in this eighth embodiment, a processing target is a spent reactor fuel in which the whole or part of metallic nuclear fuel material (e.g., uranium) is oxidized.

More specifically, as shown in FIG. 9, an oxidized spent reactor fuel 1a is first processed in an oxide reduction process 70. In the oxide reduction process 70, the salt 21 shown in FIG. 2 and FIG. 3 is used. Namely, alkaline metal chloride or alkaline earth metal chloride or a mixture thereof is heated to the melting point so as to obtain a molten salt 21, and then, the molten salt 21 thus obtained is stored in a container 20, and further, the oxidized spent reactor fuel 1a is immersed in the molten salt 21. Thereafter, alkaline metal (e.g., lithium) or alkaline earth metal (e.g., magnesium) is added into the molten salt 21 so that a reaction is made, and then, an oxide of the nuclear fuel material is reduced to metal.

Thereafter, in the cladding tube smelting separation process 2, the reactor fuel la, in which an oxide is reduced, is heated at a temperature more than a melting point of the alloy cladding tube and less than a melting point of the metallic nuclear fuel material (e.g., 650° C. to 1000° C. in the case of a fuel in which a metallic uranium fuel is covered with a magnesium alloy cladding tube), and thereby, the alloy cladding tube and an end plug are molten (fused) so as to separate from each other, and thus, a spent metallic fuel material 3 is obtained. On the other hand, an alloy cladding component 4 thus separated is made into an alloy component ingot.

On the other hand, the spent metallic fuel material 3 contains uranium and plutonium. Then, in the uranium/plutonium extraction recovery process 51, these uranium and plutonium are made in contact to a molten metallic extracting solvent (e.g., lithium, magnesium, sodium or cadmium in which uranium is dissolved), and then, are extracted into a molten cadmium, and thus, an uranium/plutonium/cadmium alloy 52 is obtained.

According to this eighth embodiment, like the aforesaid embodiments, the spent reactor fuel 1a is entirely processed without mechanically removing both ends of the spent reactor fuel 1a and the cladding tube. Therefore, it is possible to reduce an entrainment of metallic nuclear component in the cladding tube component or the like which is processed as wastes, so that the recovery can be improved, and also, wastes can be reduced.

Ninth Embodiment (FIG. 10, FIG. 11, FIG. 2 and FIG. 3)

Figure 10:
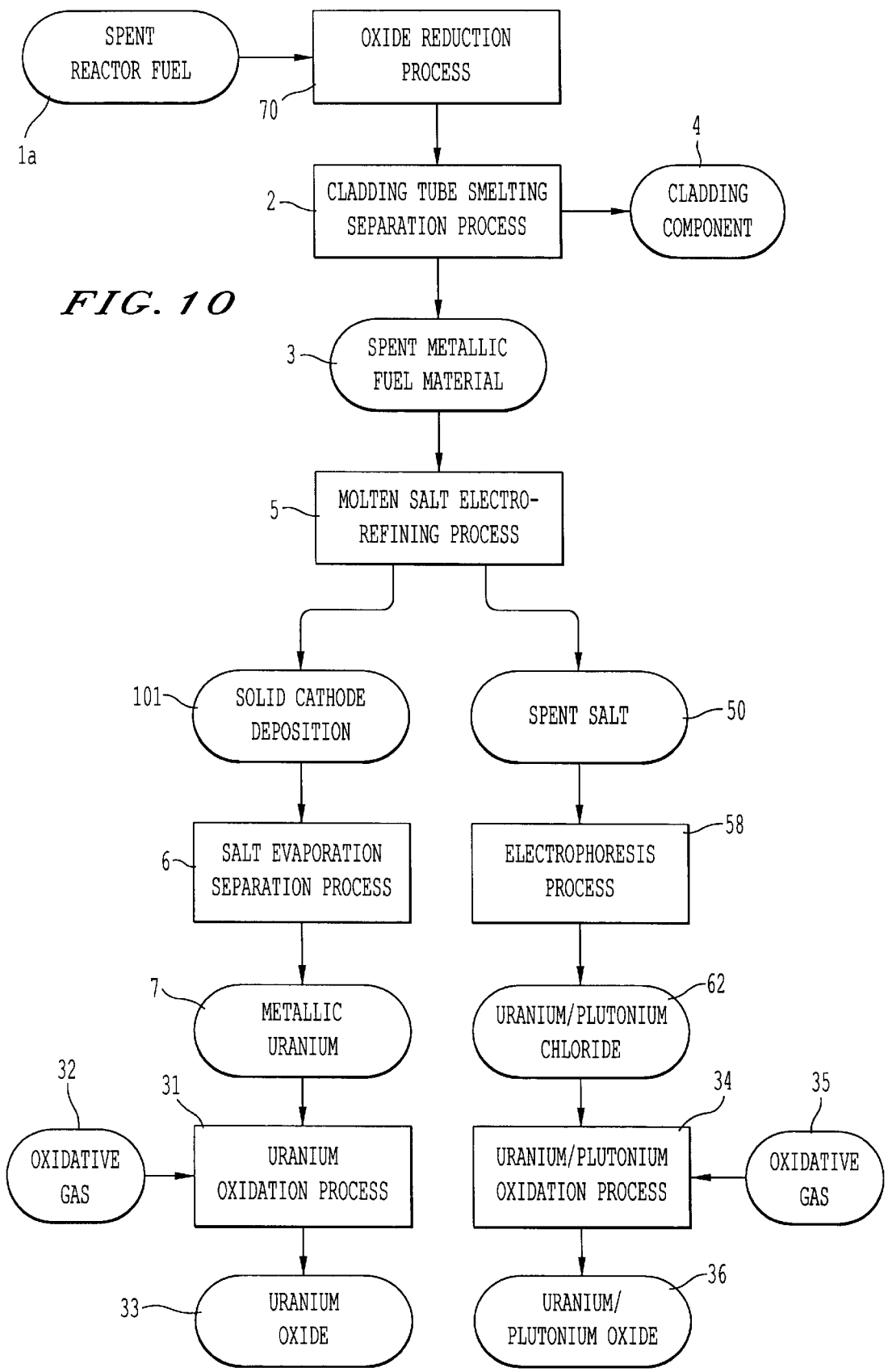
FIG. 10 is a flowchart showing a processing method of a spent reactor fuel according to a ninth embodiment of the present invention.

FIG. 10 is a flowchart showing a processing method of a spent reactor fuel according to a ninth embodiment of the present invention.

In this ninth embodiment, a processing target is a spent reactor fuel in which the whole or part of metallic nuclear fuel material (e.g., uranium) is oxidized.

More specifically, as shown in FIG. 10, an oxidized spent reactor fuel 1a is first processed in an oxide reduction process 70. In the oxide reduction process 70, the salt 21 shown in FIG. 2 and FIG. 3 is used. Namely, alkaline metal chloride or alkaline earth metal chloride or a mixture thereof is heated to the melting point so as to obtain a molten salt 21, and then, the molten salt 21 thus obtained is stored in a container 20, and further, the oxidized spent reactor fuel 1a is immersed in the molten salt 21. Thereafter, alkaline metal (e.g., lithium) or alkaline earth metal (e.g., magnesium) is added into the molten salt 21 so that a reaction is made, and then, an oxide of the nuclear fuel material is reduced to metal. The metallic nuclear fuel material (e.g., uranium) obtained in the oxide reduction process 70 is covered with an alloy cladding tube (e.g., magnesium alloy) having a melting point lower than the metallic nuclear fuel material. In this ninth embodiment, after the oxide reduction process 70, the spent reactor fuel 1a is heated in the cladding tube smelting separation process 2 at a temperature more than a melting point of the alloy cladding tube and less than a melting point of the metallic nuclear fuel material (for example, 650° C. to 1000° C. in the case where a metallic uranium fuel is covered with a magnesium alloy cladding tube), whereby the alloy cladding tube and the end plug are molten (fused) and separated from each other so as to obtain the spent metallic fuel material 3 while the separated alloy cladding component 4 being made into an alloy component ingot. Further, the spent metallic fuel material 3 is electrolytically processed in the molten salt electrorefining process 5.

In the molten salt electrorefining process 5, as shown in FIG. 2, alkaline metal chloride or alkaline earth metal chloride or a mixture thereof is heated to the melting point so as to obtain a molten salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

Next, as shown in FIG. 3, a liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the aforesaid solid cathode deposition 101. For this reason, as shown in FIG. 10, in the salt evaporation separation process 6, the salt 21 is evaporated by heating it in a normal pressure or in a pressure reducing state so as to separate from the solid cathode deposition 101, and thus, metallic uranium 7 is recovered.

Further, in the uranium oxidation process 31, the metallic uranium 7 obtained in the salt evaporation separation process 6 is heated under the atmosphere of the oxidative gas 32 (for example, a mixture gas of inert gas and oxygen gas, a mixture gas of inert gas and water vapor, or air or a mixture gas of air and water vapor) so as to be oxidized, and thereby an uranium oxide 33 is obtained.

Figure 11:
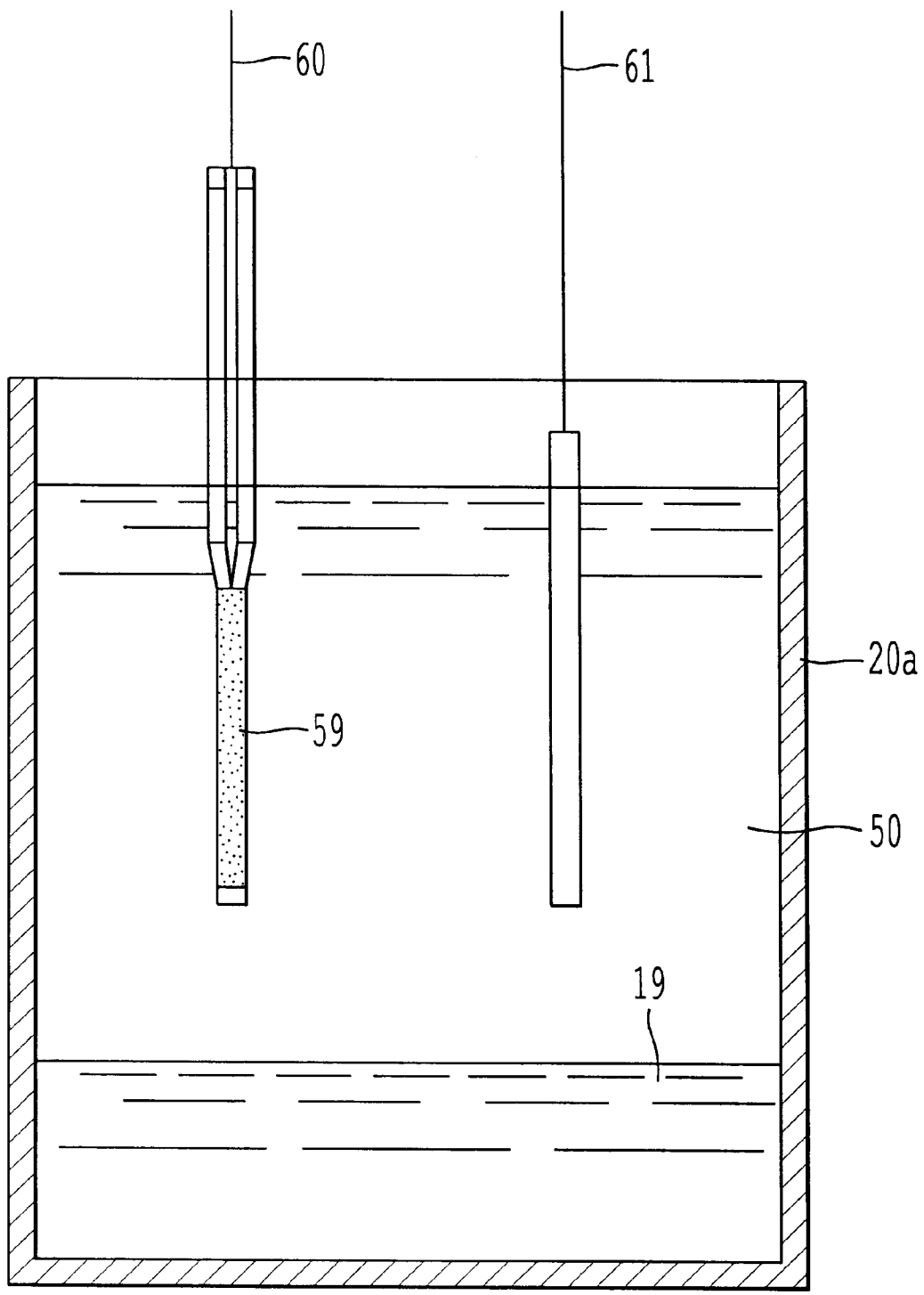
FIG. 11 is a view to explain an electrophoresis process in the case of using an anode and a cathode which are connected to a column in the above embodiment.

On the other hand, uranium and plutonium eluted from the spent metallic fuel material 3 used as an anode exist in alkaline metal chloride or alkaline earth metal chloride or a spent salt 50 which is a mixture thereof, which is stored in the container 20 after the recovery of the solid cathode deposition by the solid electrode 22. Further, in an electrophoresis process 58, these uranium and plutonium are recovered from the spent salt 50 as an uranium/plutonium chloride 62. FIG. 11 is a view to explain a processing state in the electrophoresis process 58.

As shown in FIG. 11, a molten alkaline metal chloride or alkaline earth metal chloride or a spent salt 50 which is a mixture of the former and the latter, is stored in a container 20a. A graphite anode 60 and a graphite cathode 61 are immersed in the spent salt 50. The graphite anode 60 is connected with a column (separation tube) 59 which is made of glass or ceramic filled with ceramic powder such as alumina or ceramic.

Then, a predetermined current is applied between these anode 60 and cathode 61 so that migration is generated in the spent salt 50, and uranium and plutonium ion having large valence are concentrated as chloride and recovered in the column 59.

Thereafter, the column 59 is taken out from the spent salt 50. The taken-out column 59 includes high concentration uranium and plutonium ion. Thus, as shown in FIG. 10, in the uranium/plutonium oxidation process 34, an oxidative gas 35 such as an oxygen gas or a mixture gas of the oxygen gas and chlorine gas is blown into the column 59 so as to obtain an uranium/plutonium oxide 36.

According to this ninth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 12:
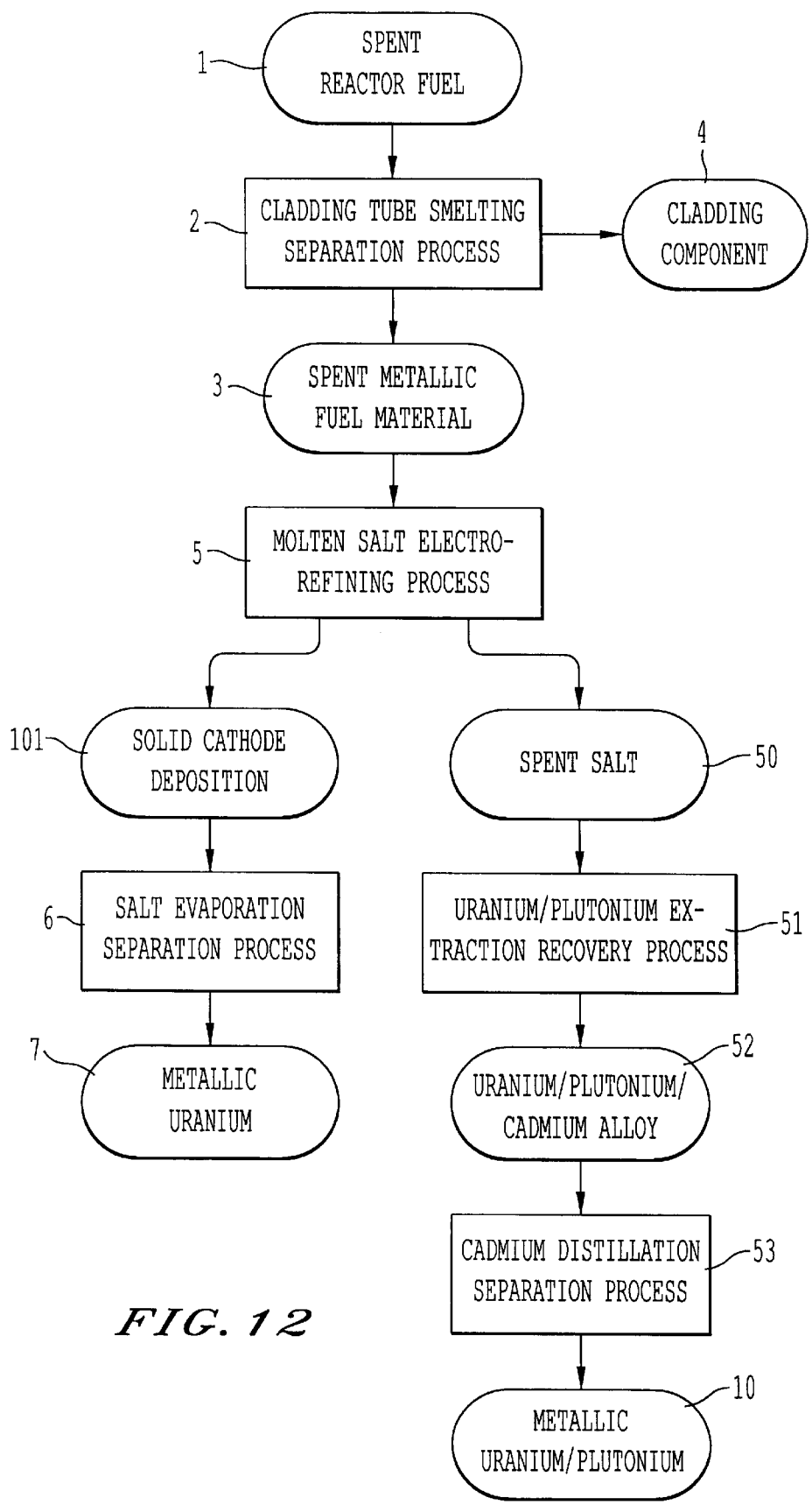
FIG. 12 is a flowchart showing a processing method of a spent reactor fuel according to a tenth embodiment of the present invention.

Tenth Embodiment (FIG. 12 and FIG. 2)

FIG. 12 is a flowchart showing a processing method of a spent reactor fuel according to a tenth embodiment of the present invention.

A fuel processed by the method of this tenth embodiment is a spent reactor fuel in which a metallic nuclear fuel material (e.g., uranium) is covered with an alloy cladding tube (e.g., magnesium alloy) having a melting point lower than the metallic nuclear fuel material, and an alloy end plug is mounted to both ends of the reactor fuel.

In this tenth embodiment, as shown in FIG. 12, in a cladding tube smelting separation process 2, the aforesaid spent reactor fuel 1 after being used in a reactor is heated at a temperature more than a melting point of the alloy cladding tube and less than a melting point of the metallic nuclear fuel material (e.g., 650° C. to 1000° C. in the case of a fuel in which a metallic uranium fuel is covered with a magnesium alloy cladding tube), and thereby, the alloy cladding tube and the end plug are molten (fused) so as to separate from each other, and thus, a spent metallic fuel material 3 is obtained. On the other hand, an alloy cladding component 4 thus separated is made into an alloy component ingot. The spent metallic fuel material 3 is electrolytically processed in a molten salt electrorefining process 5.

In the molten salt electrorefining process 5, as shown in FIG. 2, alkaline metal chloride or alkaline earth metal chloride or a mixture thereof is heated to the melting point so as to obtain a molten (fused) salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

A part of the salt 21 adheres to the aforesaid solid cathode deposition 101. For this reason, as shown in FIG. 12, in a salt evaporation separation process 6, the salt 21 is evaporated by heating it in a normal pressure or in a pressure reducing state so as to separate f from the solid cathode deposition 101, and thus, metallic uranium 7 is recovered.

On the other hand, uranium and plutonium eluted from the spent metallic fuel material 3 used as an anode exist in alkaline metal chloride or alkaline earth metal chloride or a spent salt 50 which is a mixture of the former and the latter, which is stored in the container 20 after the recovery of the solid cathode deposition by the solid electrode 22. For this reason, in an uranium/plutonium extraction recovery process 51, these uranium and plutonium are made in contact to a molten metallic extracting solvent (e.g., lithium, magnesium, sodium or cadmium in which uranium is dissolved), and then, are extracted into a molten cadmium, and thus, an uranium/ plutonium/cadmium alloy 52 is obtained.

Then, in a cadmium distillation separation process 53, the uranium/plutonium/cadmium alloy 52 is heated in a normal pressure state or in a pressure reducing state, and thereby, cadmium is evaporated so as to separate from the uranium/plutonium/cadmium alloy 52, and thus, metallic uranium/plutonium 10 is obtained.

According to this tenth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 13:
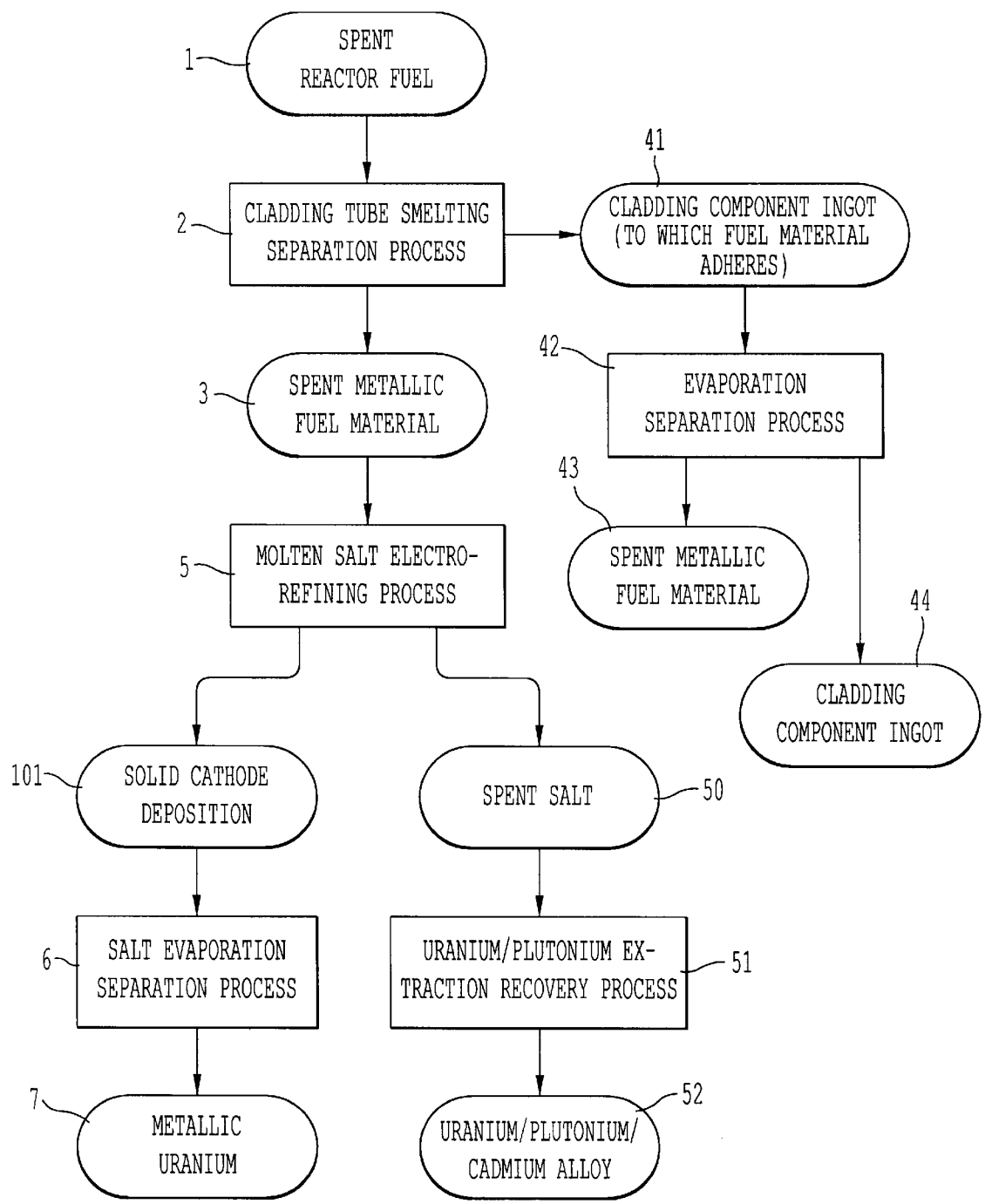
FIG. 13 is a flowchart showing a processing method of a spent reactor fuel according to an eleventh embodiment of the present invention.

Eleventh Embodiment (FIG. 13 and FIG. 2)

FIG. 13 is a flowchart showing a processing method of a spent reactor fuel according to an eleventh embodiment of the present invention.

A fuel processed by the method of this eleventh embodiment is a spent reactor fuel in which a metallic nuclear fuel material (e.g., uranium) is covered with an alloy cladding tube (e.g., magnesium alloy) having a melting point lower than the metallic nuclear fuel material, and alloy end plugs are mounted to both ends of the reactor fuel.

In this eleventh embodiment, as shown in FIG. 13, in a cladding tube smelting separation process 2, the aforesaid spent reactor fuel 1 after being used in a reactor is heated at a temperature more than a melting point of the alloy cladding tube and less than a melting point of the metallic nuclear fuel material (e.g., 650° C. to 1000° C. in the case of a fuel in which a metallic uranium fuel is covered with a magnesium alloy cladding tube), and thereby, the alloy cladding tube and the end plug are molten (fused) so as to be separated from each other, and thus, a spent metallic fuel material 3 is obtained. On the other hand, an alloy cladding component 4 thus separated is made into an alloy component ingot. The spent metallic fuel material 3 is electrolytically processed in a molten salt electrorefining process 5.

In the molten salt electrorefining process 5, as shown in FIG. 2, alkaline metal chloride or alkaline earth metal chloride or a mixture thereof is heated to the melting point so as to obtain a molten (fused) salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

A part of the salt 21 adheres to the aforesaid solid cathode deposition 101. For this reason, as shown in FIG. 13, in a salt evaporation separation process 6, the salt 21 is evaporated by heating it in a normal pressure or in a pressure reducing state so as to separate from the solid cathode deposition 101, and thus, metallic uranium 7 is recovered.

On the other hand, uranium and plutonium eluted from the spent metallic fuel material 3 used as an anode exist in alkaline metal chloride or alkaline earth metal chloride or a spent salt 50 which is a mixture thereof, which is stored in the container 20 after the recovery of the solid cathode deposition by the solid electrode 22. For this reason, in an uranium/ plutonium extraction recovery process 51, these uranium and plutonium are made in contact to a molten metallic extracting solvent (e.g., lithium, magnesium, sodium or cadmium in which uranium is dissolved), and then, are extracted into a molten cadmium, and thus, an uranium/plutonium/cadmium alloy 52 is obtained.

Further, in the case where the fuel material adheres to the cladding component ingot 41 separated from the spent metallic fuel component in the cladding smelting separation process 2, in an evaporation separation process 42, the cladding component ingot 41 is heated in a normal pressure state or in a pressure reducing state (for example, in the case where the cladding tube is a magnesium alloy, about 900 to 1200° C. in a normal pressure state, about 600 to 800° C. in a pressure reducing state of about 1 kPa) so that the cladding component is evaporated and separated, and thus, a spent metallic fuel component 43 is recovered from the cladding component ingot (to which the fuel material adheres) 41. On the other hand, the cladding component thus separated is recovered as a cladding component ingot 44.

According to this eleventh embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 14:
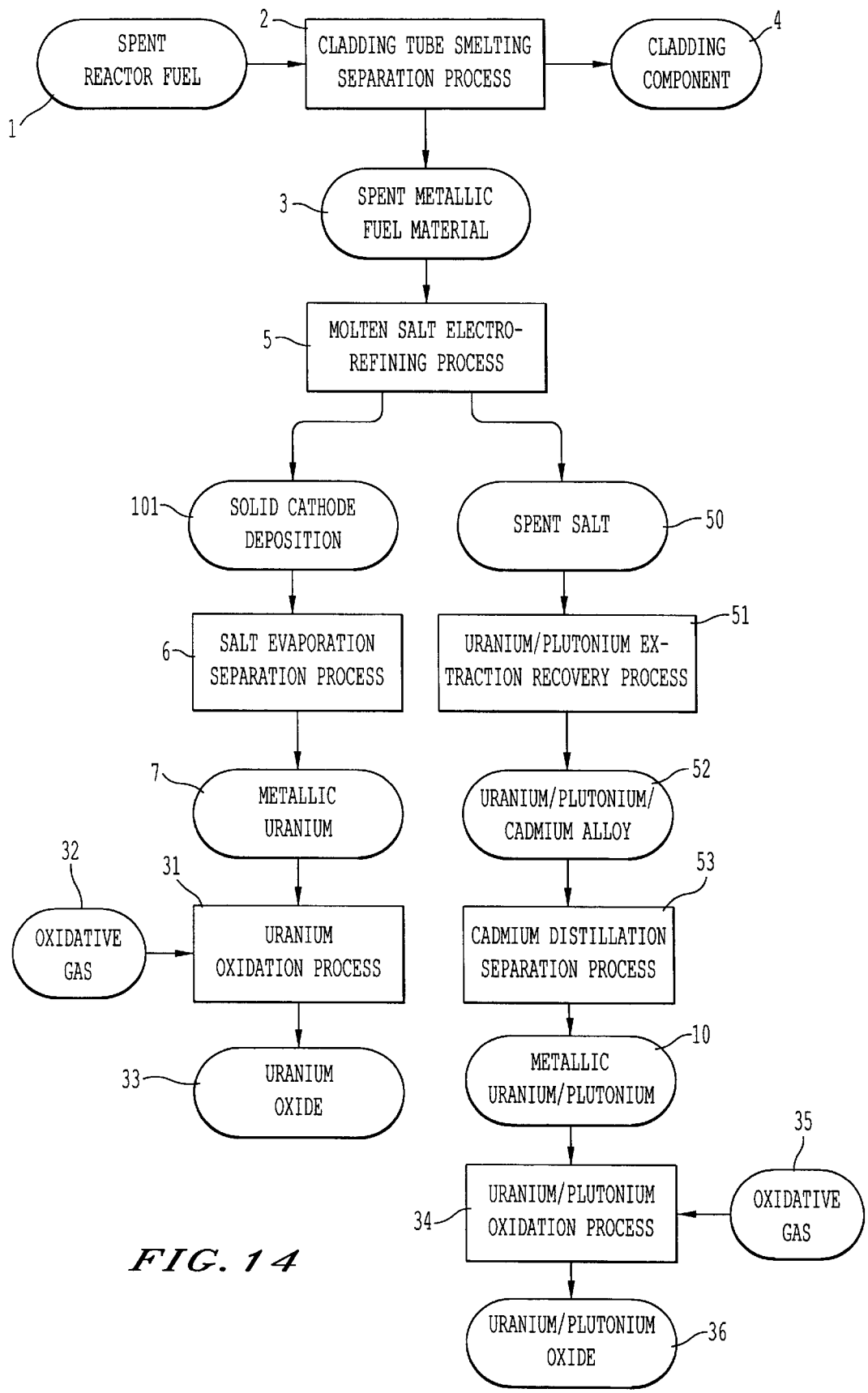
FIG. 14 is a flowchart showing a processing method of a spent reactor fuel according to a twelfth embodiment of the present invention.

Twelfth Embodiment (FIG. 14, FIG. 2 and FIG. 3)

FIG. 14 is a flowchart showing a processing method of a spent reactor fuel according to a twelfth embodiment of the present invention.

In this twelfth embodiment, a processing target is a spent reactor fuel in which the whole or part of metallic nuclear fuel material (e.g., uranium) is oxidized.

In this twelfth embodiment, as shown in FIG. 14, an oxidized spent reactor fuel 1 is first processed in an oxide reduction process 70. In the oxide reduction process 70, the salt 21 shown in FIG. 2 and FIG. 3 is used. Namely, alkaline metal chloride or alkaline earth metal chloride or a mixture of them is heated to the melting point so as to obtain a molten salt 21, and then, the molten salt 21 thus obtained is stored in a container 20, and further, the oxidized spent reactor fuel 1*a* is immersed in the molten salt 21. Thereafter, alkaline metal (e.g., lithium) or alkaline earth metal (e.g., magnesium) is added into the molten salt 21 so that a reaction is made, and then, an oxide of the nuclear fuel material is reduced to metal. The metallic nuclear fuel material (e.g., uranium) obtained in the oxide reduction process 70 is covered with an alloy cladding tube (e.g., magnesium alloy) having a melting point lower than that of the metallic nuclear fuel material. In this twelfth embodiment, after the oxide reduction process 70, the spent reactor fuel 1*a* is heated in the cladding tube smelting separation process 2 at a temperature more than a melting point of the alloy cladding tube and less than a melting point of the metallic nuclear fuel material (for example, 650° C. to 1000° C. in the case where a metallic uranium fuel is covered with a magnesium alloy cladding tube), whereby the alloy cladding tube and the end plug are molten (fused) and separated from each other so as to obtain the spent metallic fuel material 3 while the separated alloy cladding component 4 being made into an alloy component ingot.

Further, the spent metallic fuel material 3 is electrolytically processed in the molten salt electrorefining process 5.

In the molten salt electrorefining process 5, as shown in FIG. 2, alkaline metal chloride or alkaline earth metal chloride or a mixture thereof is heated to the melting point so as to obtain a molten salt 21, and then, the molten salt 21 thus obtained is stored in a container 20, and further, the spent metallic fuel material 3 is immersed in the molten salt 21 as an anode (positive pole). Moreover, a solid electrode (e.g., carbon steel) 22 is immersed in the molten salt 21 as a cathode. A current from a power source 25 is supplied to these electrodes, and thereby, the spent metallic fuel material 3 is dissolved in the molten salt 21, and further, a solid cathode deposition (metallic uranium) 101 is deposited on the solid electrode 22. A predetermined current is supplied, and thereafter, the solid cathode 22, on which the solid cathode deposition 101 is deposited, is taken out from the molten salt 21.

Next, as shown in FIG. 3, a liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the aforesaid solid cathode deposition 101. For this reason, as shown in FIG. 14, in the salt evaporation separation process 6, the salt 21 is evaporated by heating it in a normal pressure or in a pressure reducing state so as to separate from the solid cathode deposition 101, and thus, metallic uranium 7 is recovered.

Further, in the uranium oxidation process 31, the metallic uranium 7 obtained in the salt evaporation separation process 6 is heated under the atmosphere of the oxidative gas 32 (for example, a mixture gas of inert gas and oxygen gas, a mixture gas of inert gas and water vapor, or air or a mixture gas of air and water vapor) so as to be oxidized, and thereby an uranium oxide 33 is obtained.

On the other hand, uranium and plutonium eluted from the spent metallic fuel material 3 used as an anode exist in alkaline metal chloride or alkaline earth metal chloride or a spent salt 50 which is a mixture thereof, which is stored in the container 20 after the recovery of the solid cathode deposition by the solid electrode 22. For this reason, in an uranium/plutonium extraction recovery process 51, these uranium and plutonium are made in contact to a molten metallic extracting solvent (e.g., lithium, magnesium, sodium or cadmium in which uranium is dissolved), and then, are extracted into a molten cadmium, and thus, an uranium/ plutonium/cadmium alloy 52 is obtained.

Then, in a cadmium distillation separation process 53, the uranium/plutonium/cadmium alloy 52 is heated in a normal pressure state or in a pressure reducing state, and thereby, cadmium is evaporated so as to separate from the uranium/plutonium/cadmium alloy 52, and thus, metallic uranium/plutonium 10 is obtained.

Further, in an uranium/plutonium oxidation process 34, the obtained metallic uranium/plutonium 10 is heated under the atmosphere of an oxidative gas 35 (for example, a mixture gas of inert gas and oxygen gas, a mixture gas of inert gas and water vapor, or air or a mixture gas of air and water vapor) so as to be oxidized, and thereby an uranium/plutonium oxide 36 is obtained.

Figure 15:
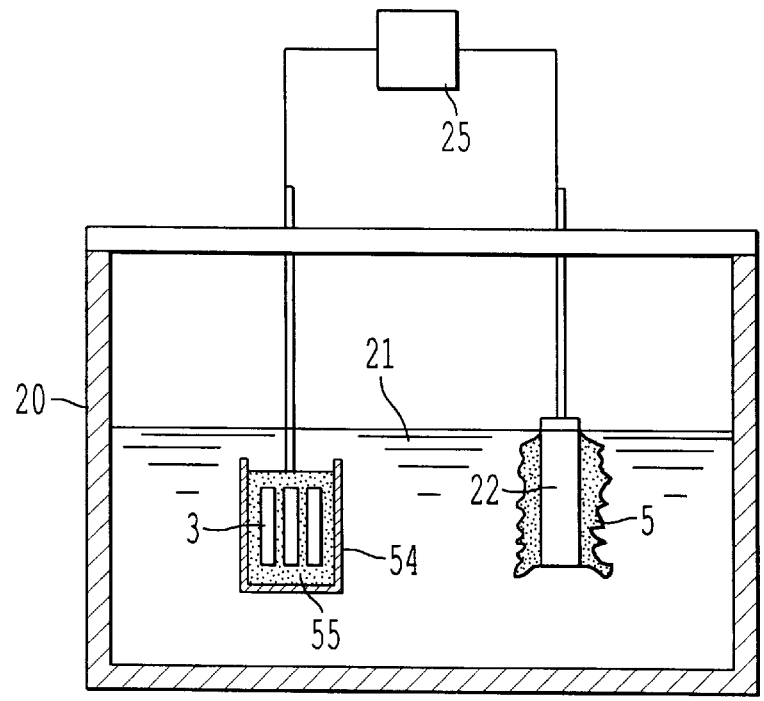
FIG. 15 is a view showing a processing method of a spent reactor fuel according to thirteenth and fourteenth embodiments of the present invention.
Figure 16:
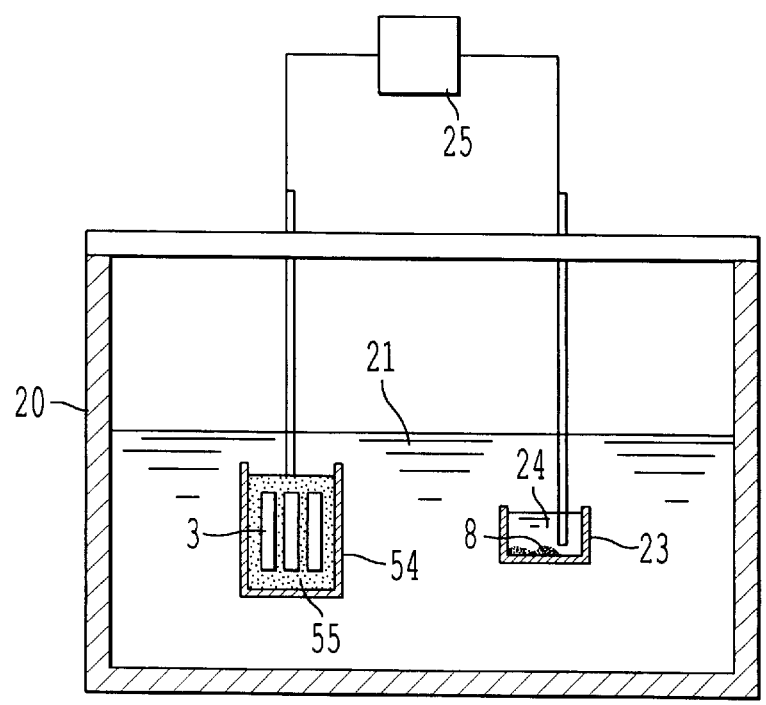
FIG. 16 is a view showing a processing method of a spent reactor fuel according to thirteenth and fourteenth embodiments of the present invention.

Thirteenth Embodiment (FIG. 15, FIG. 16 and FIG. 1)

FIG. 15 and FIG. 16 are views to explain a concept of the molten salt electrorefining process in the processing method of a spent reactor fuel according to a thirteenth embodiment of the present invention.

According to this thirteenth embodiment, in the method described in the first embodiment, the molten salt electrorefining process 5 is carried out in the following manner. More specifically, in the case of processing the spent metallic fuel material 3 in the molten salt electrorefining process 5, as shown in FIG. 15, first, alkaline metal chloride or alkaline earth metal chloride or a mixture of the former and the latter is heated to its melting point or more so that a molten salt 21 is obtained, and the obtained molten salt 21 is stored in a container 20.

Then, the spent metallic fuel material 3 is immersed in a molten metal (e.g., cadmium) stored in a crucible 54 for an anode to obtain a liquid anode 55 consisting of liquid metal, and on the other hand, a solid electrode (e.g., carbon steel) 22 is used as a cathode. Further, these liquid anode 55 and solid electrode 22 are immersed in the molten salt 21.

Subsequently, a current from a power source 25 is supplied to these electrodes so that the spent metallic fuel material 3 is dissolved in the molten salt 21, and then, the solid cathode deposition (metallic uranium) 101 is deposited on the solid cathode 22. A predetermined current is supplied, and thereafter, the solid cathode 22, on which the solid cathode deposition 101 is deposited, is taken out from the molten salt 21.

Next, as shown in FIG. 16, the liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the solid cathode deposition 101. For this reason, as shown in FIG. 1 of the first embodiment, in a salt evaporation separation process 6, the salt 21 is evaporated by heating it in a normal pressure or in a pressure reducing state so as to separate from the solid cathode deposition 101, and thus, metallic uranium 7 is recovered.

On the other hand, in the liquid cathode deposition 8, there coexists a metal (e.g., cadmium) which is a component of the liquid cathode 24, and a part of salt 21 adheres to the liquid cathode deposition 8. For this reason, in a salt/Cd evaporation separation process 9, the salt 21 and the component metal of the liquid cathode 24 is evaporated by heating them in a normal pressure or in a pressure reducing state so as to separate from the liquid cathode deposition 8, and thus, metallic uranium/plutonium 10 is recovered.

According to this thirteenth embodiment, the spent reactor fuel is entirely processed without mechanically removing both ends of the spent reactor fuel and the cladding tube. Therefore, it is possible to reduce an entrainment of metallic nuclear component in the cladding tube component or the like which is processed as wastes, so that the recovery can be improved, and also, wastes can be reduced.

Fourteenth Embodiment (FIG. 15 and FIG. 7)

According to this fourteenth embodiment, in the method described in the aforesaid sixth embodiment, the molten salt electrorefining process 5 is carried out in the following manner. More specifically, in the case of processing the spent metallic fuel material 3 in the molten salt electrorefining process 5, as shown in FIG. 15, first, alkaline metal chloride or alkaline earth metal chloride or a mixture thereof is heated to its melting point or more so that a molten salt 21 is obtained, and the obtained molten salt 21 is stored in a container 20.

Then, the spent metallic fuel material 3 is immersed in a molten metal (e.g., cadmium) stored in a crucible 54 for an anode to obtain a liquid anode 55 consisting of liquid metal, and on the other hand, a solid electrode (e.g., carbon steel) 22 is used as a cathode. Further, these liquid anode 55 and solid electrode 22 are immersed in the molten salt 21.

Subsequently, a current from a power source 25 is supplied to these electrodes so that the spent metallic fuel material 3 is dissolved in the molten salt 21, and then, the solid cathode deposition (metallic uranium) 101 is deposited on the solid cathode 22. A predetermined current is supplied, and thereafter, the solid cathode 22, on which the solid cathode deposition 101 is deposited, is taken out from the molten salt 21.

Next, as shown in FIG. 16, the liquid cathode 24 consisting of a molten metal (e.g., cadmium), which is stored in a crucible 23, is immersed in the molten salt 21 as a new cathode, and then, a current is supplied from the power source 25, and thereby, a liquid cathode deposition (e.g., metallic uranium, plutonium) 8 is deposited on the liquid cathode 24. A predetermined current is supplied, and thereafter, the liquid cathode 24 is taken out from the molten salt 21 together with the crucible 23.

A part of the salt 21 adheres to the aforesaid solid cathode deposition 101. For this reason, as shown in FIG. 7 of the sixth embodiment, in a salt evaporation separation process 6, the salt 21 is evaporated by heating it in a normal pressure or in a pressure reducing state so as to separate from the solid cathode deposition 101, and thus, metallic uranium 7 is recovered.

On the other hand, uranium and plutonium eluted from the spent metallic fuel material 3 used as an anode exist in the spent salt 50 after the recovery of the solid cathode deposition 101. For this reason, in an uranium/plutonium extraction recovery process 51, these uranium and plutonium are made in contact with a molten metallic extracting solvent (e.g., lithium, magnesium, sodium or cadmium in which uranium is dissolved), and then are extracted into a molten cadmium, and thus, an uranium/ plutonium/cadmium alloy 52 is obtained.

According to this fourteenth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

Figure 17:
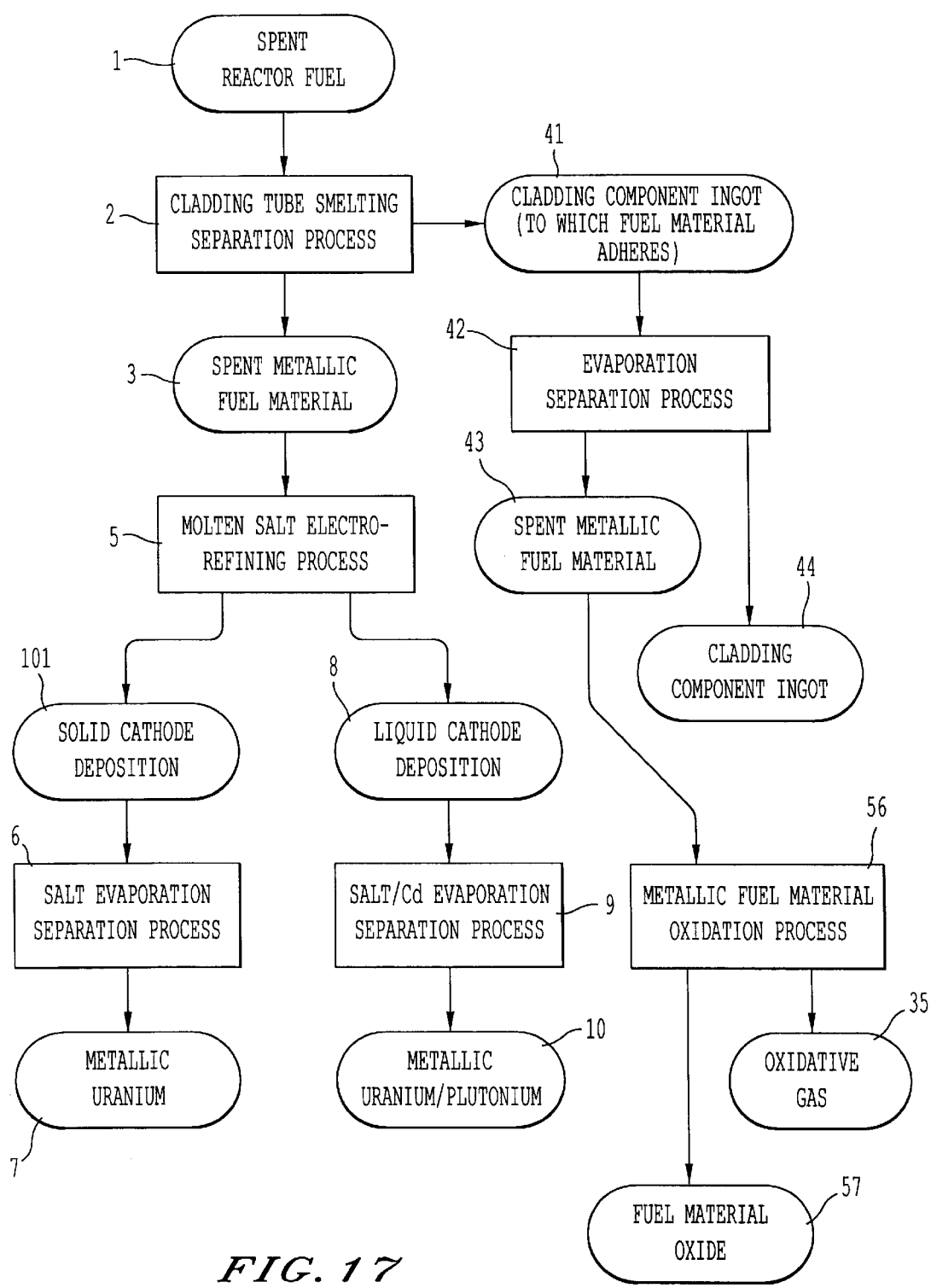
FIG. 17 is a flowchart showing a processing method of a spent reactor fuel according to a fifteenth embodiment of the present invention.

Fifteenth Embodiment (FIG. 17)

FIG. 17 is a flowchart showing a processing method of a spent reactor fuel according to a fifteenth embodiment of the present invention.

In this fifteenth embodiment, in the metallic fuel material oxidation process 56, the spent metallic fuel material 43 obtained according to the method described in the aforesaid fourth embodiment, is heated under the atmosphere of the oxidative gas 35 (for example, a mixture gas of inert gas and oxygen gas, a mixture gas of inert gas and water vapor, or air or a mixture gas of air and water vapor) so as to be oxidized, and thereby a fuel material oxide 57 is obtained.

According to this fifteenth embodiment, like the aforesaid embodiments, the spent reactor fuel 1 is entirely processed without mechanically removing both ends of the spent reactor fuel 1 and the cladding tube. Therefore, it is possible to reduce an entrainment of metallic nuclear component in the cladding tube component or the like which is processed as wastes, so that the recovery can be improved, and also, wastes can be reduced.

In the aforesaid embodiments, there are described the method of processing the reactor fuel in which a metallic nuclear fuel material (e.g., uranium) is covered with an alloy cladding tube (e.g., magnesium alloy) having a melting point lower than that of the metallic nuclear fuel material, and an alloy end plug is mounted to both ends of the reactor fuel, that is, the spent fuel after used in a reactor. The present invention is applicable not only to the case of processing the whole of the spent fuel, but also to the case of recovering a fuel component adhering to both ends and the cladding tube which are mechanically removed in the conventional reprocessing method.

Further, it is to be noted that the present invention is not limited to the described embodiments and many other changes and modifications may be made without departing from the scopes of the appended claims.

The disclosure of priority Application No. 285836/1997, which was filed in Japan on Oct. 17, 1997, is herein incorporated by reference in its entirety.

What is claimed is:

1. A method of processing a spent reactor fuel for recovering at least any one of metallic nuclear fuel materials of uranium, plutonium and transuranium element from the spent reactor fuel, in which the reactor fuel as a processing target is composed by covering the metallic nuclear fuel material with a cladding tube made of magnesium alloy and having a melting point lower than that of the metallic nuclear fuel material and end plugs made of alloy are mounted to both ends thereof, in a case of processing the spent reactor fuel as it is or processing the spent reactor fuel in a state of cutting and removing both the end plugs in a preprocess, or in a case of processing the end plugs after the cutting thereof to which a fuel component adheres, said processing method comprising:

a cladding tube smelting separation process of heating the processing target at a temperature more than a melting point of the magnesium alloy cladding tube and less than a melting point of the metallic nuclear fuel material so as to smelt and separate the magnesium alloy cladding tube or the end plugs from the metallic nuclear fuel material;

a molten salt electrorefining process of immersing the metallic nuclear fuel material, in which the magnesium alloy cladding tube or end plug is removed in the smelting separation process, in a salt consisting of a molten alkaline metal chloride or alkaline earth metal chloride or a mixture thereof to be used as an anode while a solid electrode or a molten metal electrode being used as a cathode, and dissolving the metallic nuclear fuel material in the salt by applying a current between the anode and cathode while depositing uranium, uranium and plutonium or uranium, plutonium and transuranium elements to the cathode; and a salt evaporation separation process of taking out the processing target from the salt and heating chloride or alkaline earth metal adhering to the deposited element which is deposited and adheres to the cathode in a normal pressure state or in a pressure reducing state so that the chloride or alkaline earth metal is evaporated and separated and recovering metallic uranium, uranium and plutonium, or uranium, plutonium and transuranium elements.

2. A processing method of a spent reactor fuel according to claim 1, wherein in a case where a part of the metallic nuclear fuel material of the processing target is an oxide, before the cladding tube smelting separation process is carried out, the processing method further includes an oxide reduction process of immersing the processing target in a salt consisting of a molten alkaline metal chloride or alkaline earth metal chloride or a mixture thereof, and in this state, further adding alkaline metal or alkaline earth metal to the salt so that an oxide of the metallic nuclear fuel material is reduced to metal.

3. A processing method of a spent reactor fuel according to claim 1, wherein, after the salt evaporation separation process, the processing method further includes an oxidation process of heating a recovered metallic uranium, uranium and plutonium, or uranium, plutonium and transuranium element, under an atmosphere of an oxidative gas so that an uranium oxide, uranium oxide and plutonium oxide, or uranium oxide, plutonium oxide and transuranium element oxide are obtained.

4. A processing method of a spent reactor fuel according to claim 1, wherein when the cladding tube is molten and separated from the metallic nuclear fuel material by heating the cladding tube at a temperature more than a melting point of the alloy cladding tube and less than a melting point of the metallic nuclear fuel material, in a case where the nuclear fuel material is entrained in the separated cladding tube alloy component, the processing method further includes an alloy component evaporation separation process of recovering the nuclear fuel material entrained in the alloy component by heating the metallic nuclear fuel material in a normal pressure state or in a pressure reducing state with the use of a difference in a steam pressure between the nuclear fuel material and the alloy component, and by evaporating and separating the alloy component.

5. A processing method of a spent reactor fuel according to claim 4, wherein the processing method further includes a metallic fuel material oxidation process of heating the spent metallic nuclear fuel material, which is entrained in the cladding tube alloy component recovered in the evaporation separation process, under the atmosphere of the oxidative gas, and recovering the spent metallic nuclear fuel as a fuel material oxide.

6. A processing method of a spent reactor fuel according to claim 1, wherein iron or molybdenum capable of selectively recovering uranium is used as a material which is used in the cladding tube smelting separation process and is used as a material for the cathode for depositing uranium, uranium and plutonium, or uranium, plutonium and transuranium element, or cadmium, zinc, bismuth, lead or aluminum capable of being recovered by distillation at a low boiling point and forming an intermetallic compound with plutonium.

7. A processing method of a spent reactor fuel according to claim 1, wherein the metallic nuclear fuel material from which the cladding tube is removed, is immersed in molten cadmium, bismuth, lead, zinc, and further, is immersed in the molten alkaline metal chloride or alkaline earth metal chloride or a mixture thereof, and then, a current is applied to an anode using the molten metal and to a cathode using a solid electrode or a molten metal electrode, and the metallic nuclear fuel material is dissolved in the molten salt while uranium, uranium and plutonium, or uranium, plutonium and transuranium element being recovered to the cathode.

8. A processing method of a spent reactor fuel according to claim 1, wherein, after the cladding tube smelting separation process is carried out, the processing method further includes an uranium/plutonium extraction recovery process of immersing the metallic nuclear fuel material, in which the cladding tube is removed, in a molten alkaline metal chloride or alkaline earth metal chloride or a mixture thereof, and making contact the metallic nuclear fuel material to molten cadmium, in which magnesium, sodium, or uranium is dissolved, and thereby, extracting uranium and plutonium, or uranium, plutonium and transuranium elements, which are dissolved in the molten alkaline metal chloride or alkaline earth metal chloride or a mixture thereof from the metallic nuclear fuel material, in the molten cadmium eluted from the molten alkaline metal chloride or alkaline earth metal chloride or a mixture thereof so as to recover them as an alloy with cadmium.

9. A method of processing a spent reactor fuel for recovering at least any one of metallic nuclear fuel materials of uranium, plutonium and transuranium element from the spent reactor fuel, in which the reactor fuel as a processing target is composed by covering the metallic nuclear fuel material with a cladding tube made of magnesium alloy and having a melting point lower than that of the metallic nuclear fuel material and end plugs made of alloy are mounted to both ends thereof, in a case of processing the spent reactor fuel as it is or processing the spent reactor fuel in a state of cutting and removing both the end plugs in a preprocess, or in a case of processing the end plugs after the cutting thereof to which a fuel component adheres, said processing method comprising:

a cladding tube smelting separation process of heating the processing target at a temperature more than a melting point of the magnesium alloy cladding tube and less than a melting point of the metallic nuclear fuel material so as to smelt and separate the magnesium alloy cladding tube or the end plugs from the metallic nuclear fuel material;

a molten salt electrorefining process of immersing the metallic nuclear fuel material, in which the magnesium alloy cladding tube or end plug is removed in the smelting separation process, in a salt consisting of a molten alkaline metal chloride or alkaline earth metal chloride or a mixture thereof to be used as an anode while a solid electrode or a molten metal electrode being used as a cathode, and dissolving the metallic nuclear fuel material in the salt by applying a current between the anode and cathode while depositing uranium to the cathode;

a salt evaporation separation process of taking out the processing target from the salt and heating chloride or alkaline earth metal adhering to the deposited element which is deposited and adheres to the cathode in a normal pressure state or in a pressure reducing state so that the chloride or alkaline earth metal is evaporated and separated and recovering uranium; and an uranium/plutonium extraction recovery process of making contact the salt used in the molten salt electrorefining process to molten cadmium in which lithium has been dissolved and extracting uranium and plutonium, or uranium, plutonium and transuranium elements, which are dissolved in the salt from the metallic nuclear fuel material used as the anode, in the molten cadmium eluted from the salt so as to recover said element as an alloy with cadmium.

10. A processing method of a spent reactor fuel according to claim 9, wherein the extraction recovery process uses molten cadmium, in which magnesium in place of lithium is dissolved and makes contact the salt to the molten cadmium in which magnesium has been dissolved, and extracts uranium and plutonium, or uranium, plutonium and transuranium elements, which are dissolved in the salt from the metallic nuclear fuel material used as the anode, in the molten cadmium eluted from the salt so as to recover the elements as an alloy with cadmium.

11. A processing method of a spent reactor fuel according to claim 9, wherein the extraction recovery process uses molten cadmium, in which sodium in place of lithium is dissolved and makes contact the salt to the molten cadmium in which sodium has been dissolved and extracts uranium and plutonium, or uranium, plutonium and transuranium elements, which are dissolved in the salt from the metallic nuclear fuel material used as the anode, in the molten cadmium eluted from the salt so as to recover the elements as an alloy with cadmium.

12. A processing method of a spent reactor fuel according to claim 9, wherein the extraction recovery process uses molten cadmium, in which uranium in place of lithium is dissolved and makes contact the salt to the molten cadmium in which uranium has been dissolved and extracts uranium and plutonium, or uranium, plutonium and transuranium elements, which are dissolved in the salt from the metallic nuclear fuel material used as the anode, in the molten cadmium eluted from the salt so as to recover the elements as an alloy with cadmium.

13. A processing method of a spent reactor fuel according to claim 9, wherein in a case where a part of the metallic nuclear fuel material of the processing target is an oxide, before the cladding tube smelting separation process, the processing method further includes an oxide reduction process of immersing the processing target in a salt consisting of a molten alkaline metal chloride or alkaline earth metal chloride or a mixture thereof, and further adding alkaline metal or alkaline earth metal so that an oxide of the metallic nuclear fuel material is reduced to metal.

14. A processing method of a spent reactor fuel according to claim 9, wherein the processing method further includes a cadmium distillation separation process of heating the recovered cadmium alloy in a normal pressure state or in a pressure reducing state so that only cadmium is evaporated to be separated and removed from uranium and plutonium, or uranium, plutonium and transuranium element, and recovering metallic uranium and plutonium, or uranium, plutonium and transuranium element.

15. A processing method of a spent reactor fuel according to claim 14, wherein the processing method further includes an uranium/plutonium oxidation process of heating metallic uranium and plutonium, or uranium, plutonium and transuranium element, which is recovered in the cadmium distillation separation process, under the atmosphere of the oxidative gas, and obtaining uranium oxide and plutonium oxide, or uranium oxide, plutonium oxide and transuranium element oxide.

16. A processing method of a spent reactor fuel according to claim 9, wherein, after the cladding tube smelting separation process of heating the magnesium alloy cladding tube at a temperature more than a melting point of the magnesium alloy cladding tube and less than a melting point of the metallic nuclear fuel material so that the magnesium alloy cladding tube is molten and separated from the metallic nuclear fuel material, in a case where the nuclear fuel material is entrained in an alloy component of the separated alloy cladding tube, the processing method further includes an evaporation separation process of heating the magnesium alloy cladding tube in a normal pressure state or in a pressure reducing state with the use of a difference in steam pressure between the nuclear fuel material and the alloy component so that the alloy component is evaporated and separated, and thereby, recovering the nuclear fuel material entrained in the alloy component.

17. A processing method of a spent reactor fuel according to claim 16, wherein the processing method further includes a metallic fuel material oxidation process of heating the spent metallic nuclear fuel material, which is entrained in the cladding tube alloy component recovered in the evaporation separation process, under the atmosphere of the oxidative gas, and recovering the spent metallic nuclear fuel as a fuel material oxide.

18. A processing method of a spent reactor fuel according to claim 9, wherein the metallic nuclear fuel material from which the cladding tube is removed, is immersed in molten cadmium, bismuth, lead, zinc, and further, is immersed in the molten alkaline metal chloride or alkaline earth metal chloride or a mixture thereof, and then, a current is applied to an anode using the molten metal and to a cathode using a solid electrode, and thereby, the metallic nuclear fuel material is dissolved in the molten salt while uranium being recovered to the cathode.

19. A method of processing a spent reactor fuel for recovering at least any one of metallic nuclear fuel materials of uranium, plutonium and transuranium element from the spent reactor fuel, in which the reactor fuel as a processing target is composed by covering the metallic nuclear fuel material with a cladding tube made of magnesium alloy and having a melting point lower than that of the metallic nuclear fuel material and end plugs made of alloy are mounted to both ends thereof, in a case of processing the spent reactor fuel as it is or processing the spent reactor fuel in a state of cutting and removing both the end plugs in a preprocess, or in a case of processing the end plugs after the cutting thereof to which a fuel component adheres, said processing method comprising:

a cladding tube smelting separation process of heating the processing target at a temperature more than a melting point of the magnesium alloy cladding tube and less than a melting point of the metallic nuclear fuel material so as to smelt and separate the magnesium alloy cladding tube or the end plugs from the metallic nuclear fuel material;

a molten salt electrorefining process of immersing the metallic nuclear fuel material, in which the magnesium alloy cladding tube or end plug is removed in the smelting separation process, in a salt consisting of a molten alkaline metal chloride or alkaline earth metal chloride or a mixture thereof to be used as an anode while a solid electrode or a molten metal electrode being used as a cathode, and dissolving the metallic nuclear fuel material in the salt by applying a current between the anode and cathode while depositing uranium to the cathode;

a salt evaporation separation process of taking out the processing target from the salt and heating chloride or alkaline earth metal chloride adhering to the deposited element which is deposited and adheres to the cathode in a normal pressure state or in a pressure reducing state so that the chloride or alkaline earth metal is evaporated and separated and recovering uranium; and an uranium/plutonium extraction recovery process of making contact the salt used in the molten salt electrorefining process to molten cadmium in which lithium has been dissolved and extracting uranium and plutonium, or uranium, plutonium and transuranium elements, which are dissolved in the salt from the metallic nuclear fuel material used as the anode, in the molten cadmium eluted from the salt so as to recover said element as an alloy with cadmium, wherein in place of the extraction process of processing the spent salt, the processing method further includes an electrophoresis process and an uranium/plutonium oxidation process of immersing a cathode and an anode connected to a column which is filled with ceramic powder in the spent salt, generating migration by applying a current to both electrodes so that ion of uranium and plutonium, or uranium, plutonium and transuranium element is concentrated and recovered to the column located on the anode, and thereafter, taking out the column and blowing an oxidative gas into the column, thereby recovering uranium and plutonium, or uranium, plutonium and transuranium element as a deposition oxide.

\* \* \* \* \*